Oct. 13, 1970 H. L. BLASBALG ET AL 3,534,264

ADAPTIVE DIGITAL COMMUNICATION SYSTEM

Filed April 15, 1966 11 Sheets-Sheet 1

INVENTORS
BLASBALG
HAYASE
CRUTCHFIELD
NAJJAR
BY John W. Giraud Jr.
ATTORNEY

Oct. 13, 1970 H. L. BLASBALG ET AL 3,534,264

ADAPTIVE DIGITAL COMMUNICATION SYSTEM

Filed April 15, 1966 11 Sheets-Sheet 5

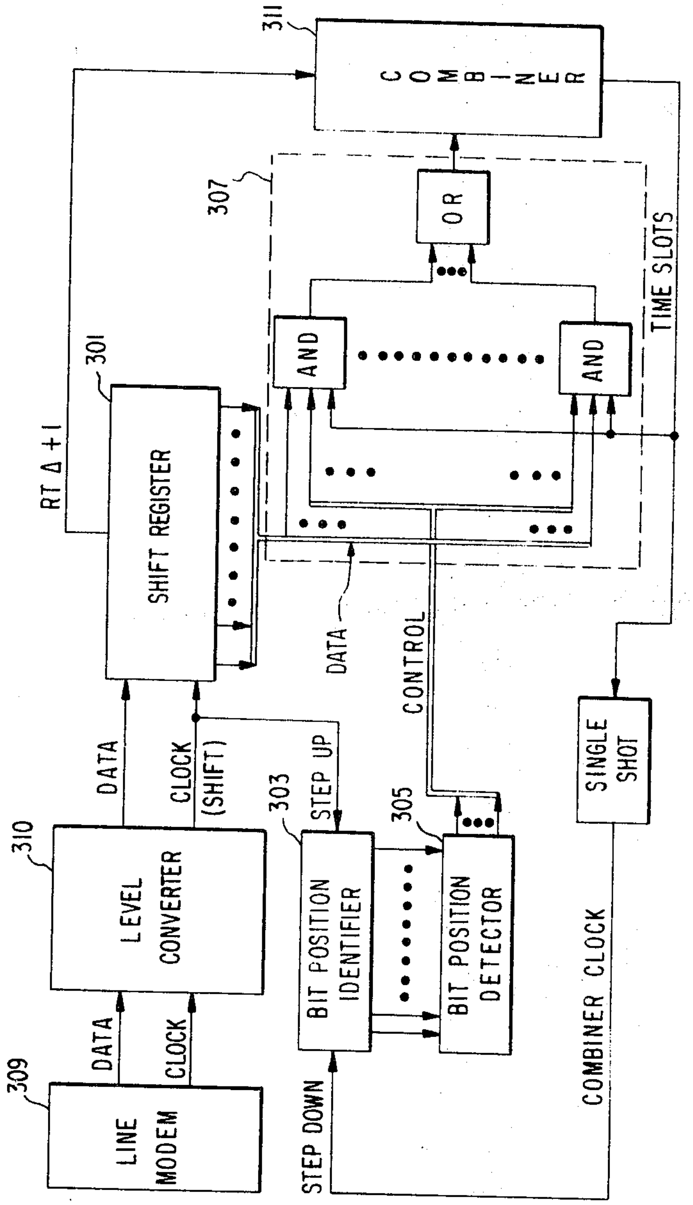

FIG. 7

THIS EXAMPLE ASSUMES THE OUTPUT OF COMBINER IS AT RATE $2^6 \times 75(1+K)$

1 FRAME OF FIXED LENGTH

| SLOTS → | S 1 | S 2 | S 3 | S 4 | S 5 | S 6 | S 7 | S 8 | S 9 | S 10 | S 11 | S 12 | S 13 | S 14 | S 15 | S 16 |
|---|---|---|---|---|---|---|---|---|---|---|---|---|---|---|---|---|
| LINE Nos. | L1 | L8 | L7 | L8 | L6 | L8 | L7 | L8 | L5 | L8 | L7 | L8 | L6 | L8 | L7 | L8 |

| SLOTS → | S 17 | S 18 | S 19 | S 20 | S 21 | S 22 | S 23 | S 24 | S 25 | S 26 | S 27 | S 28 | S 29 | S 30 | S 31 | S 32 |
|---|---|---|---|---|---|---|---|---|---|---|---|---|---|---|---|---|
| LINE Nos. | L2 | L8 | L7 | L8 | L6 | L8 | L7 | L8 | L5 | L8 | L7 | L8 | L6 | L8 | L7 | L8 |

| SLOTS → | S 33 | S 34 | S 35 | S 36 | S 37 | S 38 | S 39 | S 40 | S 41 | S 42 | S 43 | S 44 | S 45 | S 46 | S 47 | S 48 |
|---|---|---|---|---|---|---|---|---|---|---|---|---|---|---|---|---|
| LINE Nos. | L3 | L8 | L7 | L8 | L6 | L8 | L7 | L8 | L5 | L8 | L7 | L8 | L6 | L8 | L7 | L8 |

| SLOTS → | S 49 | S 50 | S 51 | S 52 | S 53 | S 54 | S 55 | S 56 | S 57 | S 58 | S 59 | S 60 | S 61 | S 62 | S 63 | S 64 |
|---|---|---|---|---|---|---|---|---|---|---|---|---|---|---|---|---|
| LINE Nos. | L4 | L8 | L7 | L8 | L6 | L8 | L7 | L8 | L5 | L8 | L7 | L8 | L6 | L8 | L7 | L8 |

(a) BEFORE ADAPTING

| | S1 | S2 | S3 | S4 | S5 | S6 | S7 | S8 | S9 | S10 | S11 | S12 | S13 | S14 | S15 | S16 |
|---|---|---|---|---|---|---|---|---|---|---|---|---|---|---|---|---|
| | L1 | L7 | L6 | L7 | L5 | L7 | L6 | L7 | L2 | L7 | L6 | L7 | L5 | L7 | L6 | L7 |

| | S17 | S18 | S19 | S20 | S21 | S22 | S23 | S24 | S25 | S26 | S27 | S28 | S29 | S30 | S31 | S32 |
|---|---|---|---|---|---|---|---|---|---|---|---|---|---|---|---|---|
| | L3 | L7 | L6 | L7 | L5 | L7 | L6 | L7 | L4 | L7 | L6 | L7 | L5 | L7 | L6 | L7 |

(b) AFTER ADAPTING

FIG. 9

3,534,264

ADAPTIVE DIGITAL COMMUNICATION SYSTEM

Herman L. Blasbalg, Baltimore, Joshua Y. Hayase, Bethesda, and Richard C. Crutchfield, Jr., Potomac, Md., and Hann F. Najjar, Annandale, Va., assignors to International Business Machines Corporation, Armonk, N.Y., a corporation of New York Filed Apr. 15, 1966, Ser. No. 542,934
Int. Cl. H01b 1/38
U.S. Cl. 325—15 6 Claims This invention relates to an adaptive digital communication system and more particularly to a communication system wherein the transmission rate is varied in accordance with the error parameters of the received signal. The invention herein described was made in the course of or under a contract with the U.S. Army.

Digital communication systems are subject to varying degrees of random errors due to the varying environmental conditions in the environment in which they operate. A great portion of these errors may be reduced by increasing the energy per bit of the transmitted signal. However, it is very inefficient to transmit at full energy per bit when the environmental conditions which cause a high error rate such as thermal noise, for example, are not present. Furthermore, in certain communication systems the down link power is limited. For example, a satellite communication system operates through a channel which is limited in down link power; hence, receiver thermal noise is a primary cause of received bit errors. Further, in such systems the received average signal power may fluctuate slightly at a slow rate due to satellite spin and the deviation of the satellite antenna pattern from an omni-directional pattern. There may be deeper fluctuations due to natural causes in the received signal power, which are also expected to occur at a slow rate.

Various attempts have been made to provide an efficient communications system which will adapt to changing environmental conditions. One such known system monitors the signal-to-noise ratio of the received signal. When the signal-to-noise ratio exceeds a specified unit, a control signal is sent to the transmitter which instructs the transmitter to stop transmission. Transmission is stopped for a fixed period and then is again attempted. If the signal-to-noise ratio is above the specified limit, transmission will continue. If the received signal is still intolerable, the transmitter is once again turned off for a fixed period of time. Such an adaptive system could be highly inefficient in a digital data communication system and especially in a satellite communication system due to potentially long periods of idleness caused by external noise. Also, the error rate of such a prior art system would be high just prior to shut down.

Another known adaptive system is disclosed in copending application Ser. No. 469,125, entitled Data Transmission System, invented by Alexander H. Frey, Jr., and assigned to the same assignee as that of the present application. In this system, the number of redundancy bits to be transmitted is varied in accordance with the received signal error rate. That is, as the error rate of the received signal increases, the number of redundancy bits transmitted is increased to compensate for the error causing conditions. This system necessarily involves more complex encoding and decoding mechanisms than does the subject system.

The instant adaptive system is one wherein the bit duration of the transmitted data is varied in accordance with the error rate of the received signal. Increasing the bit duration increases the energy of the transmitted data bit signal but also decreases the rate at which data is transmitted. Further, when the transmission rate is increased or decreased, the rate at which information arrives at the transmitter must also be increased or decreased since otherwise, a large buffer storage would be necessitated. The subject adaptive system also necessitates the use of a novel multiplexer. In most communication systems, the information to be transmitted is derived from a plurality of sources, multiplexed together into one complex message, transmitted to the receiver, and demultiplexed into a plurality of information messages. The rates at which the digital information is supplied from the sources varies in accordance with the source user. Thus, a plurality of inputs are presented to the multiplexer, each of which may be at the same or different rates as any other respective input. In order to adapt a communications system by decreasing the transmission rate of the communications link, it is necessary to delete certain ones of the inputs to the transmission system in accordance with priorities assigned by the channel users and in accordance with the rates of each of the inputs. Thus, the multiplexer configuration is such as to readily adapt by increasing the bit durations of selected input information while deleting selected input sources of low priority.

Accordingly, it is an object of this invention to adapt to varying environmental conditions in a digital communication system by varying the transmission rate and bit duration of the transmitted signal.

An additional object is to multiplex a plurality of incoming signals into a multiplexed signal which can be readily adapted to increased bit duration.

A further object is to multiplex and combine a plurality of incoming signal messages each of which could have a rate differing or the same as any other incoming message into a time division multiplexed waveform without necessitating a buffer storage device.

Another object is to provide a multiplexer which can combine a plurality of incoming messages each of which have a rate that can be the same as or different from each other incoming message rate into a single multiplexed interleaved bit signal which can readily be adapted to provide increased bit duration for preselected bits without necessitating buffer storage.

A still further object is to provide an adaptive communication system which can adapt without necessitating the interruption of transmission of information.

An additional object is to provide an adaptive communication system having a built-in safety margin so that information is not lost after channel conditions have degraded but prior to adaption.

In accordance with one aspect of this invention, means are provided at the receiver to monitor the signal-to-noise ratio of the received signal. When the signal-to-noise ratio exceeds a specified limit, a signal is sent to the transmitter informing it that it must adapt to the noisy environmental condition by sending a signal providing more energy per bit. Upon receipt of this signal, the transmitting station deletes certain ones of its information inputs in accordance with a priority scheme assigned by the users. The remaining inputs are then multiplexed into a signal having a data rate that is lower and a bit duration that is longer than the signal previously transmitted. This multiplexed signal having a longer bit duration is preceded by a control signal which will inform the receiving system to demodulate, decode and demultiplex the information signal following the control signal at the new transmission rate.

In accordance with another aspect of the invention, a combining means is provided which readily allows bit length adapting. The combining means combines a plurality of inputs each of which may have a bit rate which is any multiple of a fixed integer into an interleaved time division multiplexed output signal. A timing slot generator is provided to generate a number of timing slots dependent on the number and rates of the input signals. Each individual input is then assigned time slots in accordance with its rate and its adaptive priority. For example, an input having the lowest data rate would be assigned one time slot within a frame, an input having twice that data rate would be assigned two time slots, one having three times that data rate would be assigned three time slots and so on. Hence, each input is interleaved with each other input in accordance with its information rate. Further, the interleaving is done in a manner such that when inputs having a low priority are decoupled in order to adapt to a lower link transmission rate, the remaining inputs in the multiplexed waveform may readily have their bit durations increased. For example, if the bit rate were to be halved, the bit interleaving is accomplished in such a manner that every other bit in the multiplexed output is of high priority. Thus, when it is necessary to drop the low priority bits, the high priority bits may have their bit duration increased without displacing any other adjacent bits.

In accordance with an additional aspect of this invention, an error control encoder is provided which inserts redundancy bits into the transmitted message. These redundancy bits supply an added safety margin so that as the channel degrades beyond a prefixed error rate, the transmitted information may still be recovered at the receiving station before the system is adapted. Since the data input rate from the multiplexer to the encoder varies, it is also necessary to adapt the encoder to varying input rates. Similarly, the decoder is also adapted.

The foregoing and other objects, features and advantages of the invention will be apparent from the following more particular description of preferred embodiments of the invention as illustrated in the accompanying drawings.

Figure 4A:
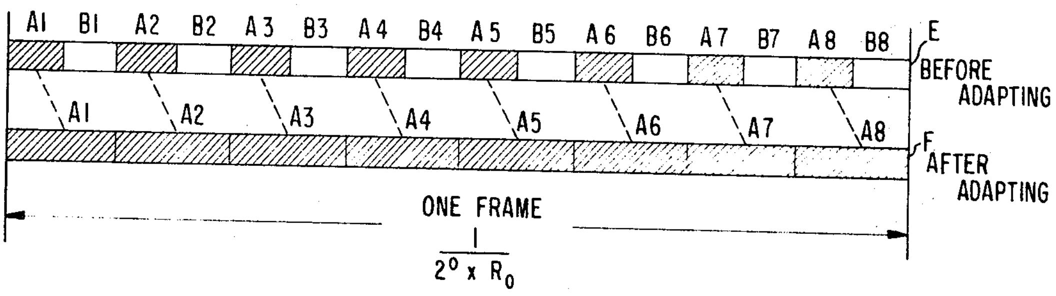
Figure 4B:
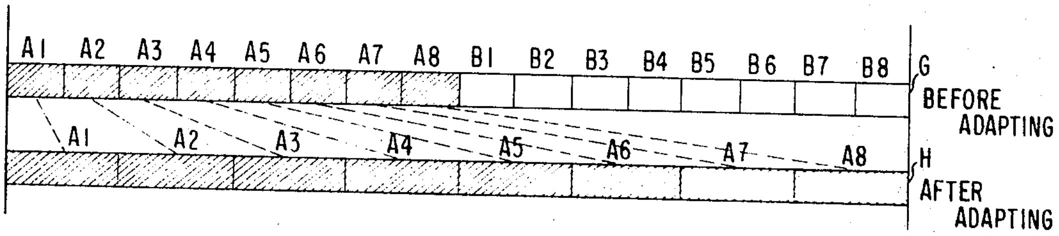

FIGS. 4*a* and 4*b* are a timing diagram showing two methods of systematically assigning slots in the adaptive multiplexer.

Figure 5:
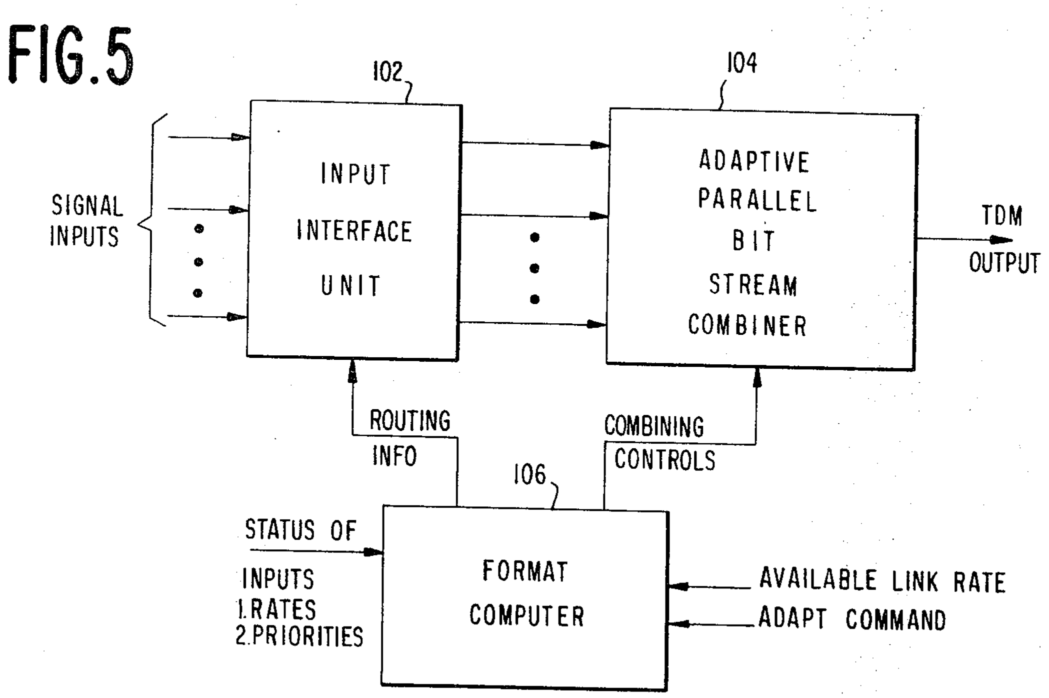

FIG. 5 is a functional block diagram of the adaptive digital multiplexer.

Figure 6:
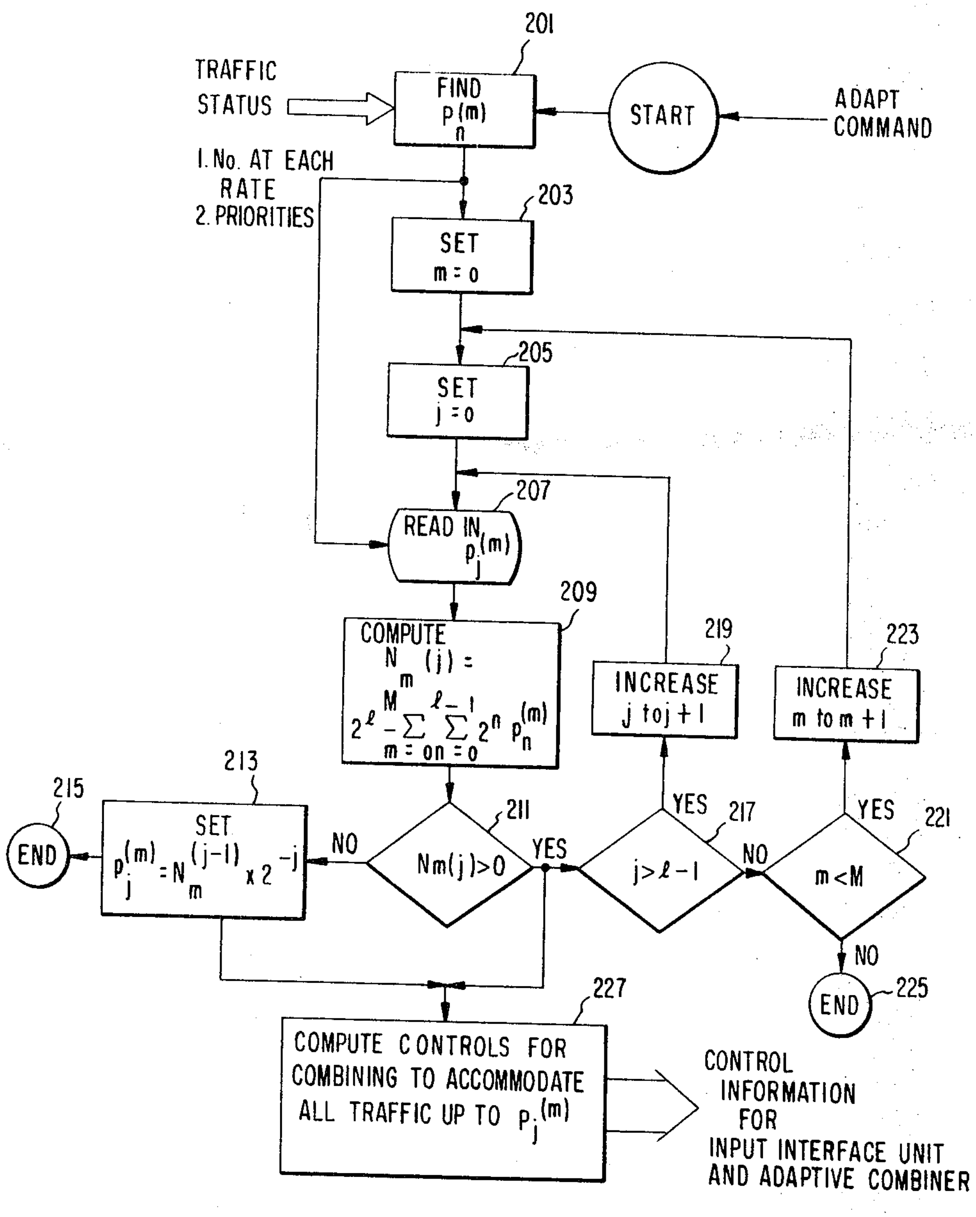

FIG. 6 is a computer program flow diagram for formatting messages of varying priorities.

FIG. 7 is a block diagram of an input/output interface device.

Figure 8:
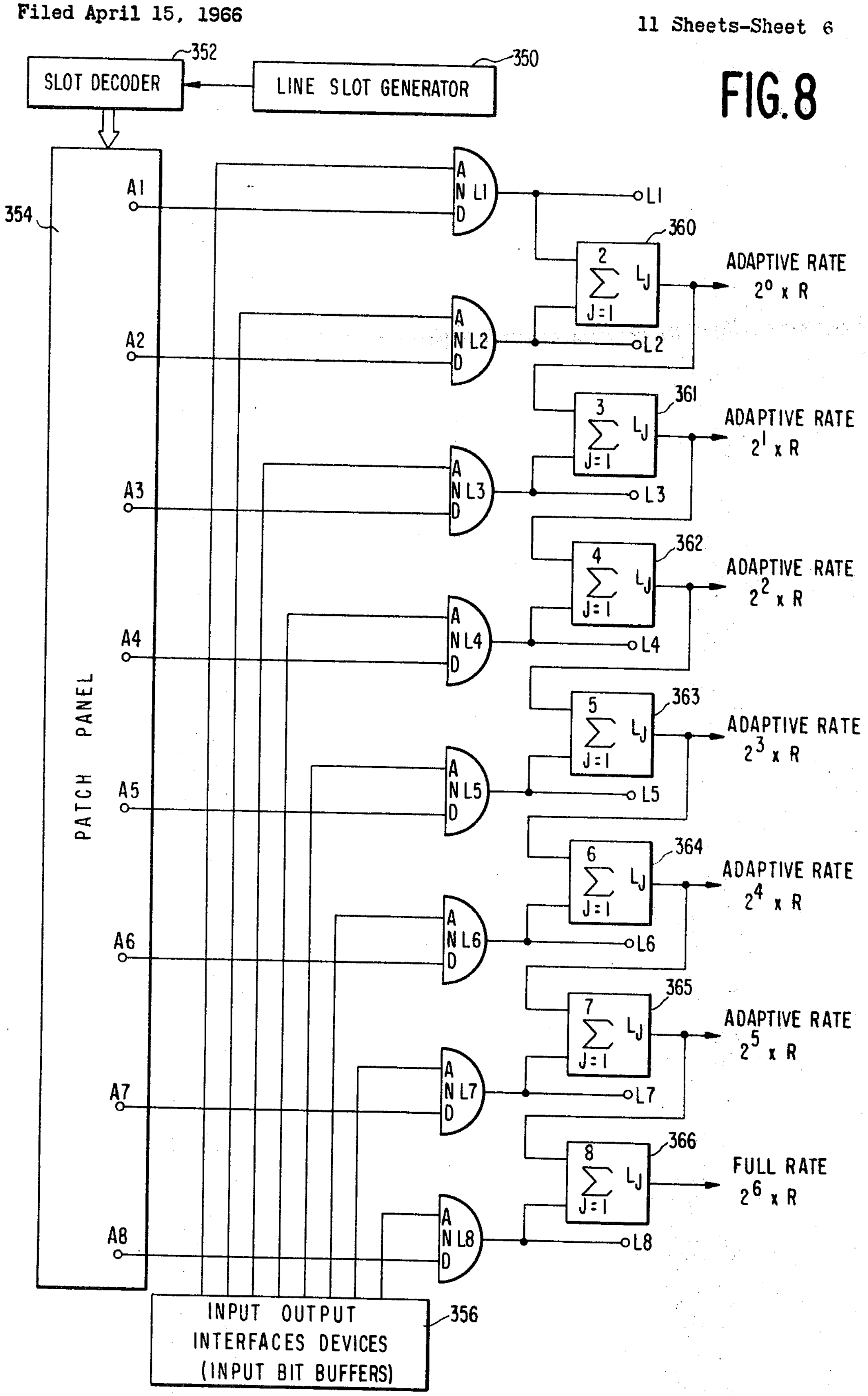

FIG. 8 is a block diagram of a switching matrix combiner.

FIG. 9*a* is a timing diagram representing the assignment of time slots prior to adapting and FIG. 9*b* is a timing diagram representing the time slots of FIG. 9*a* which remain after adapting.

Figure 10:
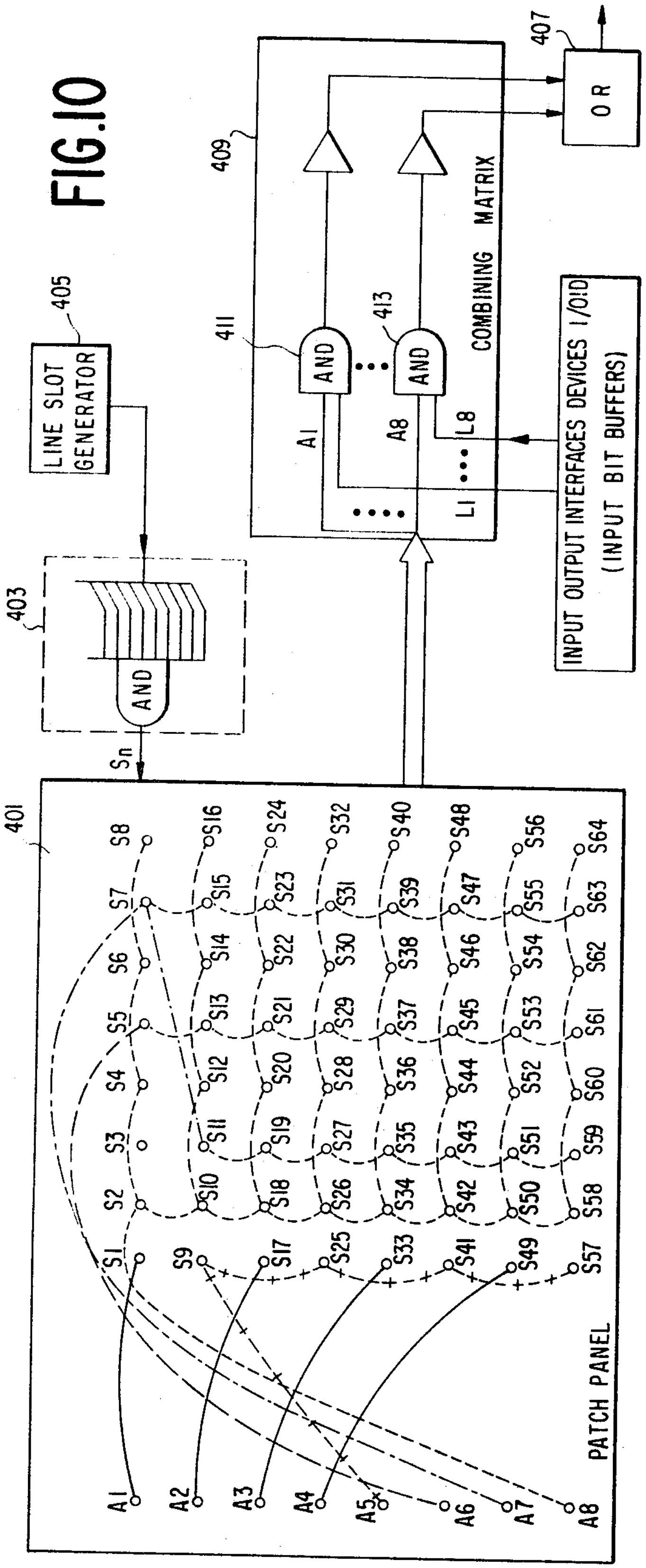

FIG. 10 is a diagram representing a wired patch panel of an adaptive combiner.

Figure 11:
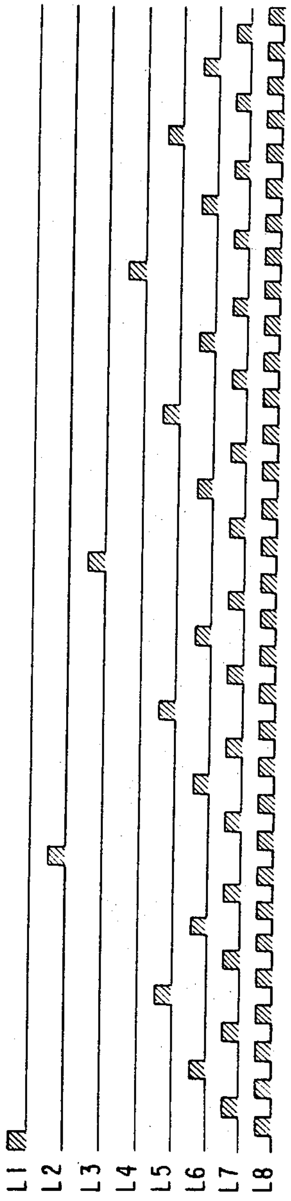

FIG. 11 is a timing diagram showing the relative slot position on a per line basis after combining.

Figure 12:
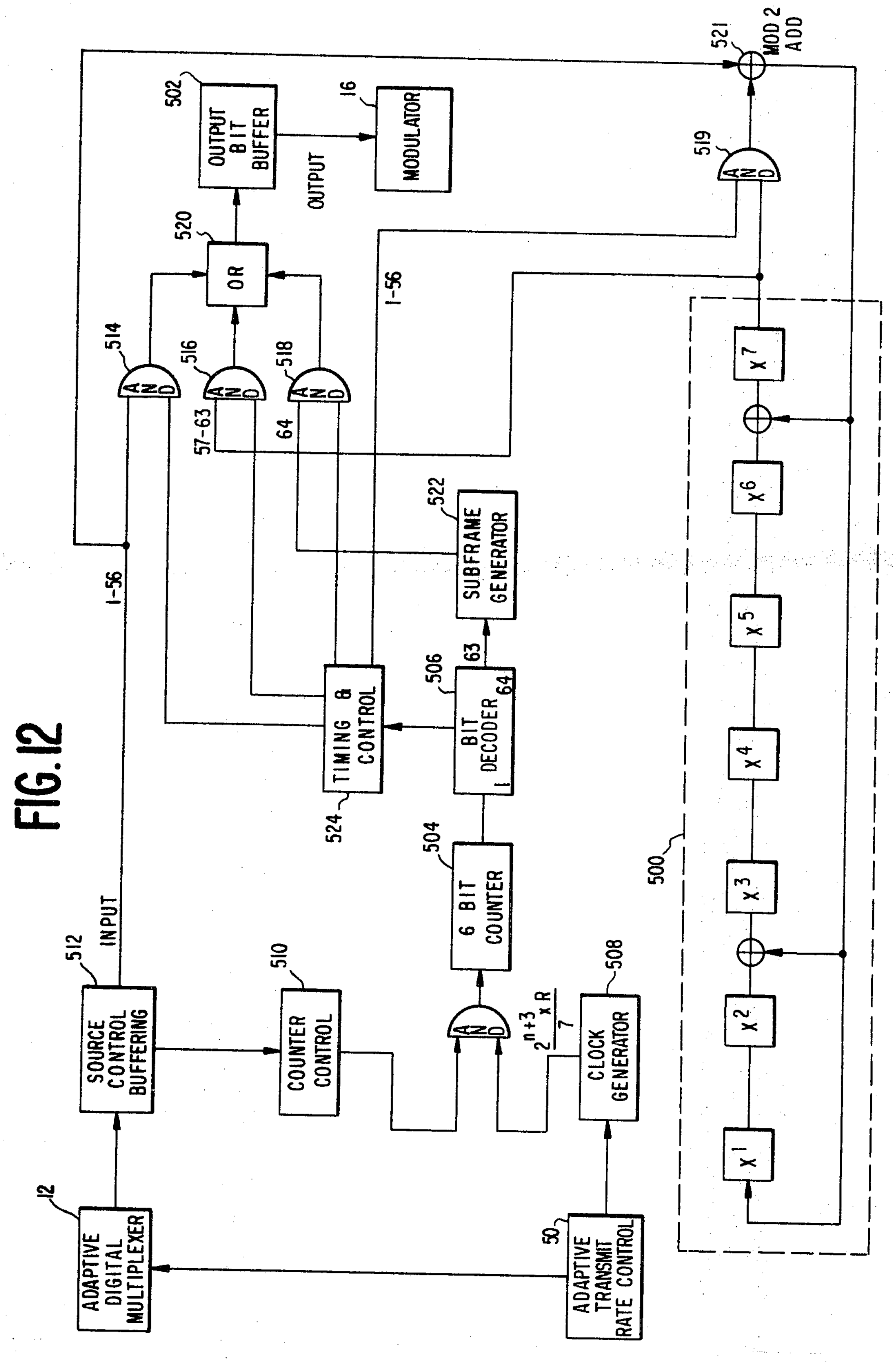

FIG. 12 is a block diagram of an error control encoder.

Figure 13:
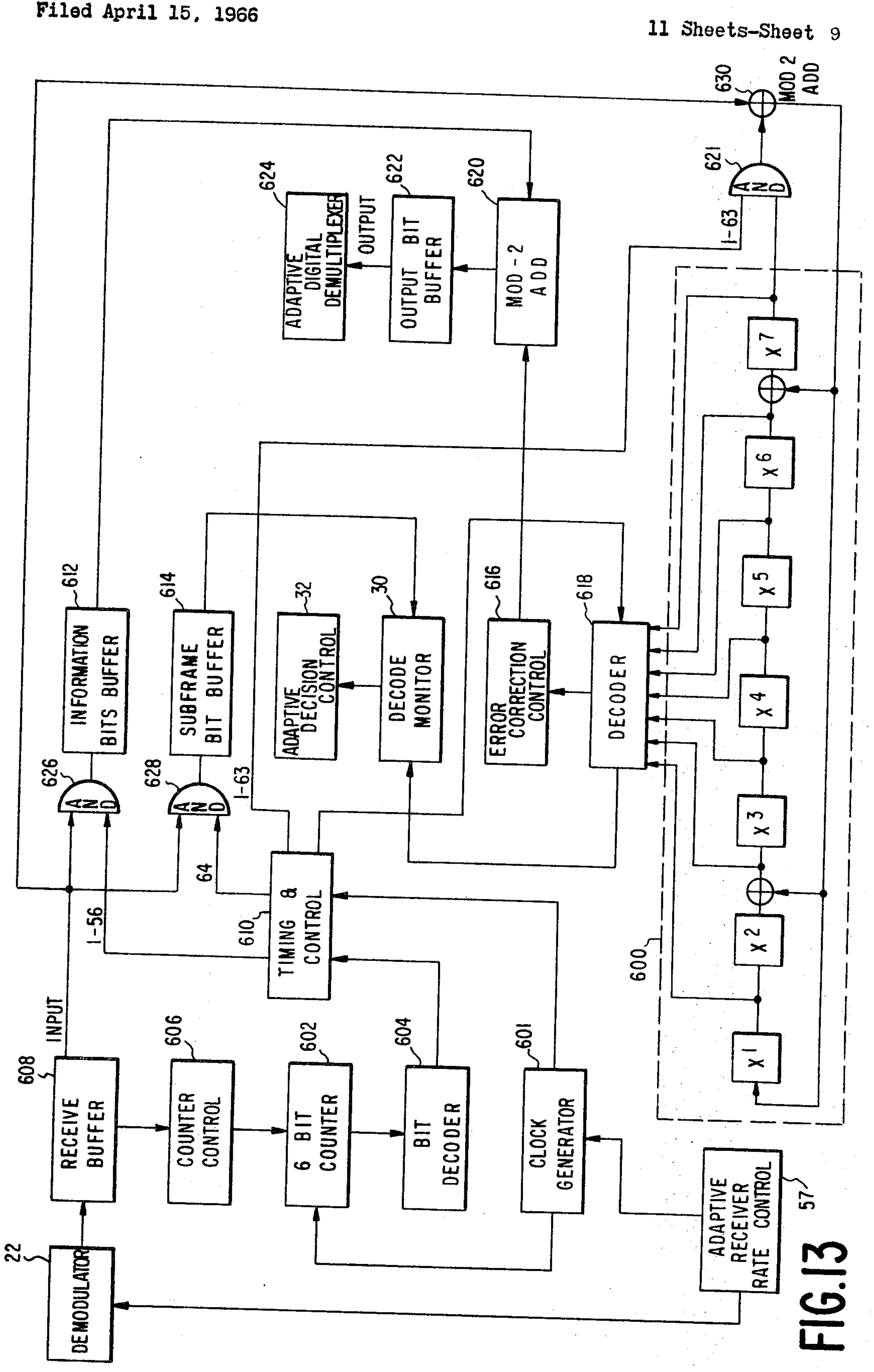

FIG. 13 is a block diagram of an error control decoder.

Figure 14:
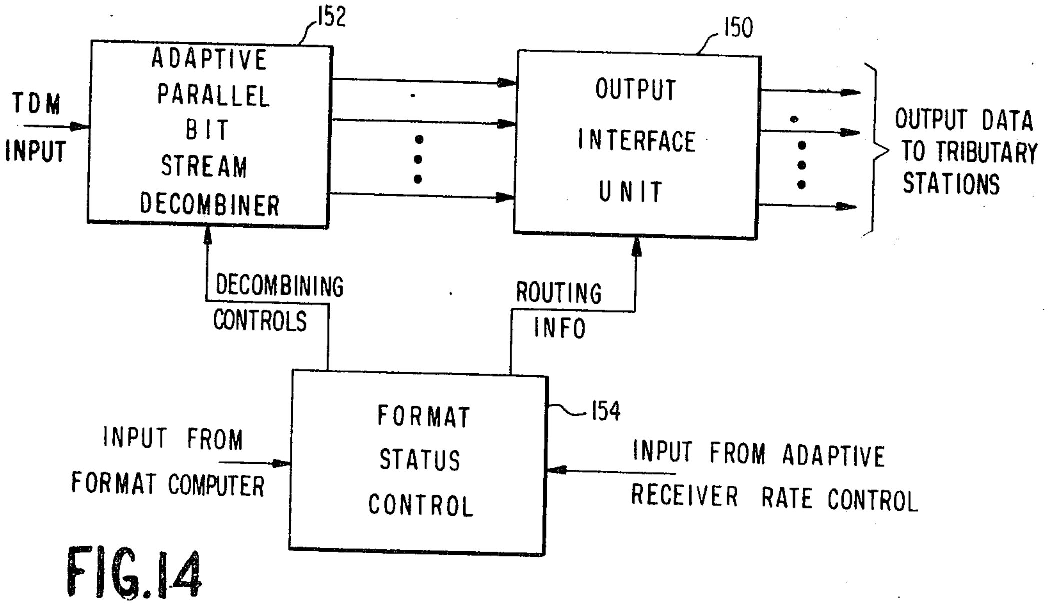

FIG. 14 is a block diagram of an adaptive digital demultiplexer.

Figure 15:
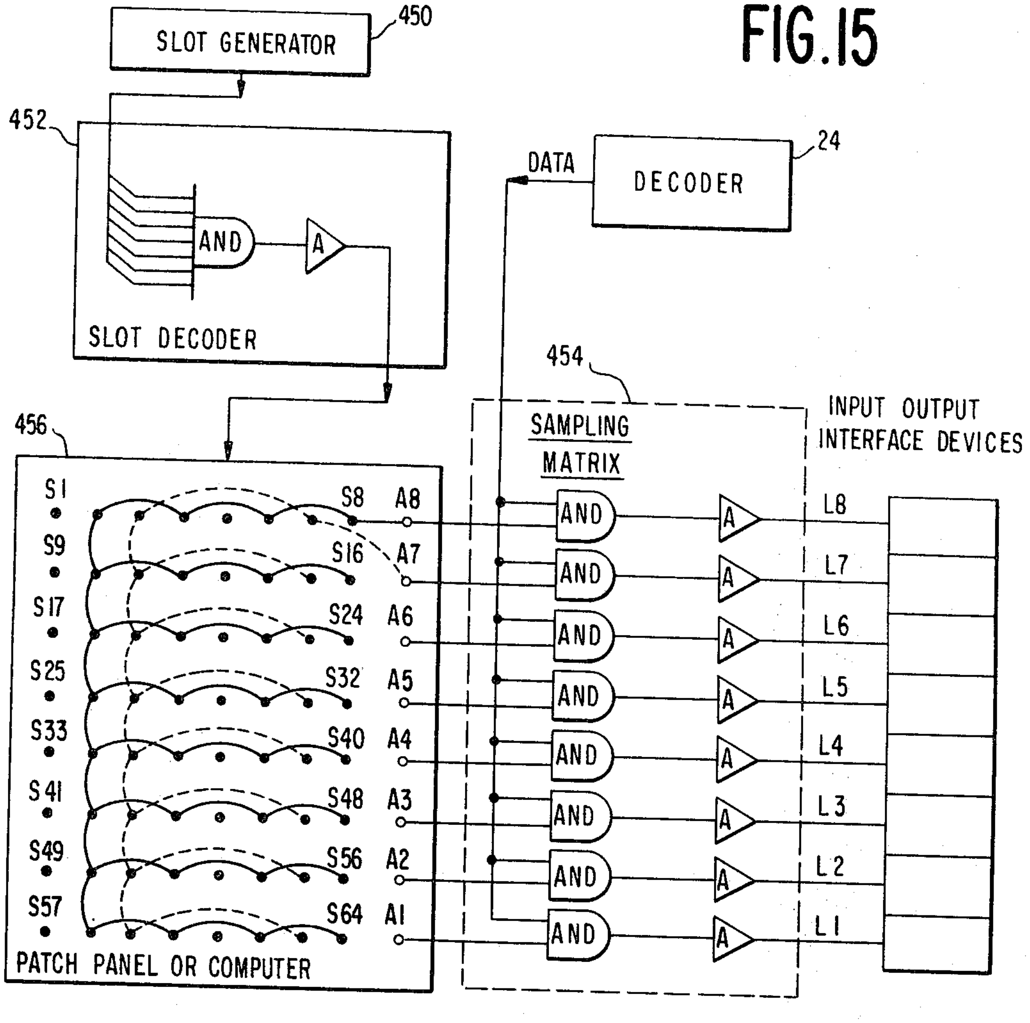

FIG. 15 is a block diagram of the sampling part of the decombiner.

Figure 16:
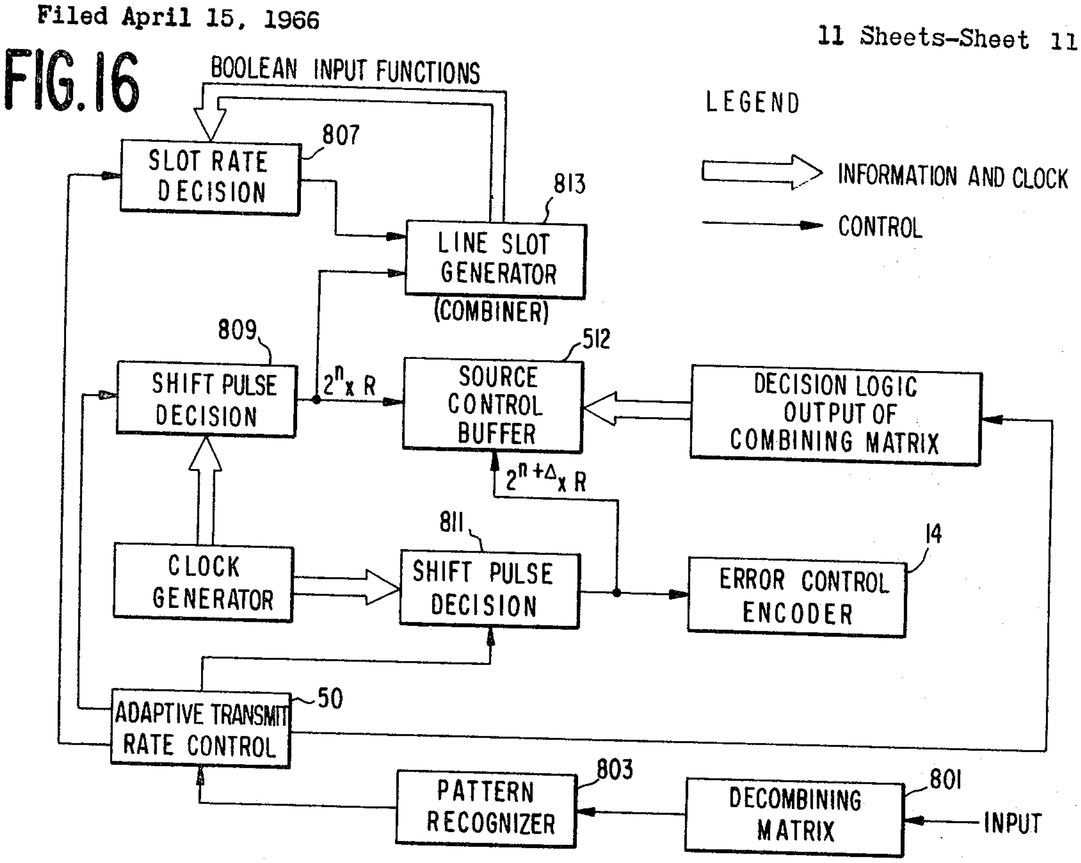

FIG. 16 is a block diagram of the transmitter control loops for on-line adapting.

Figure 17:
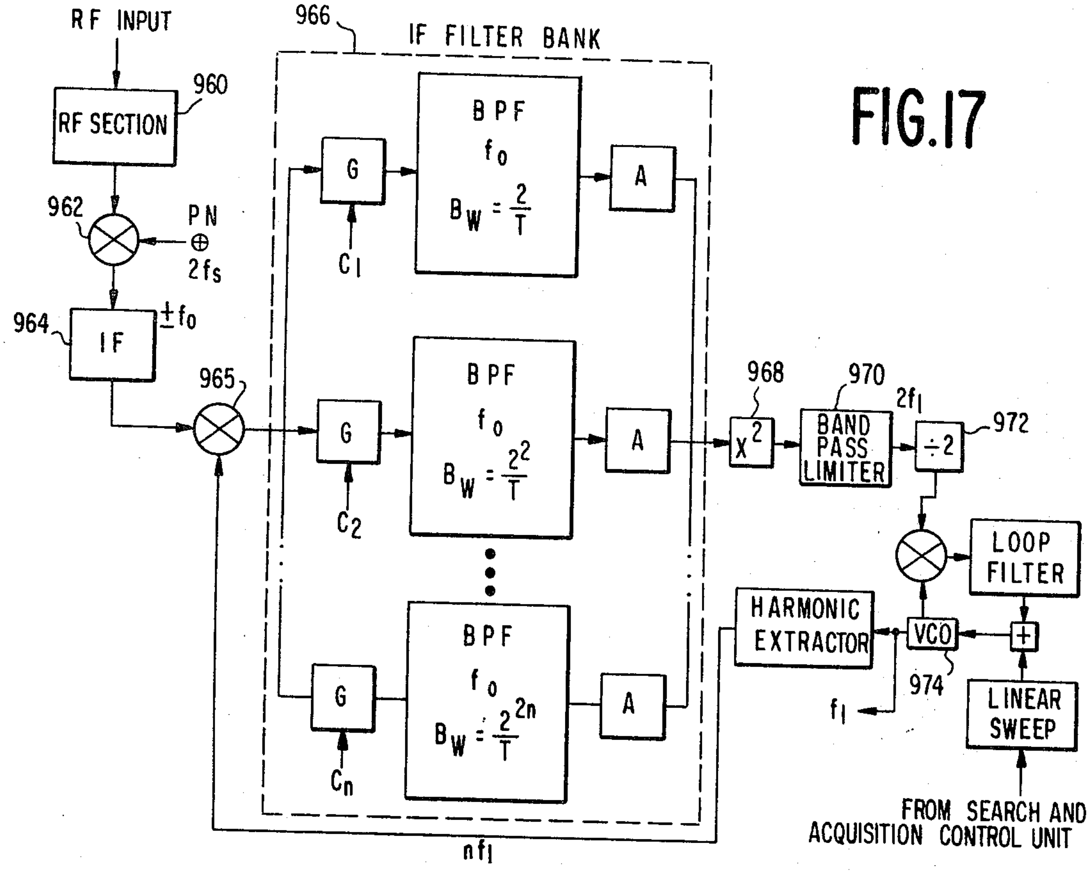

FIG. 17 is a block diagram of the RF carrier extraction circuit of the demodulator.

GENERAL DESCRIPTION

Figure 1:
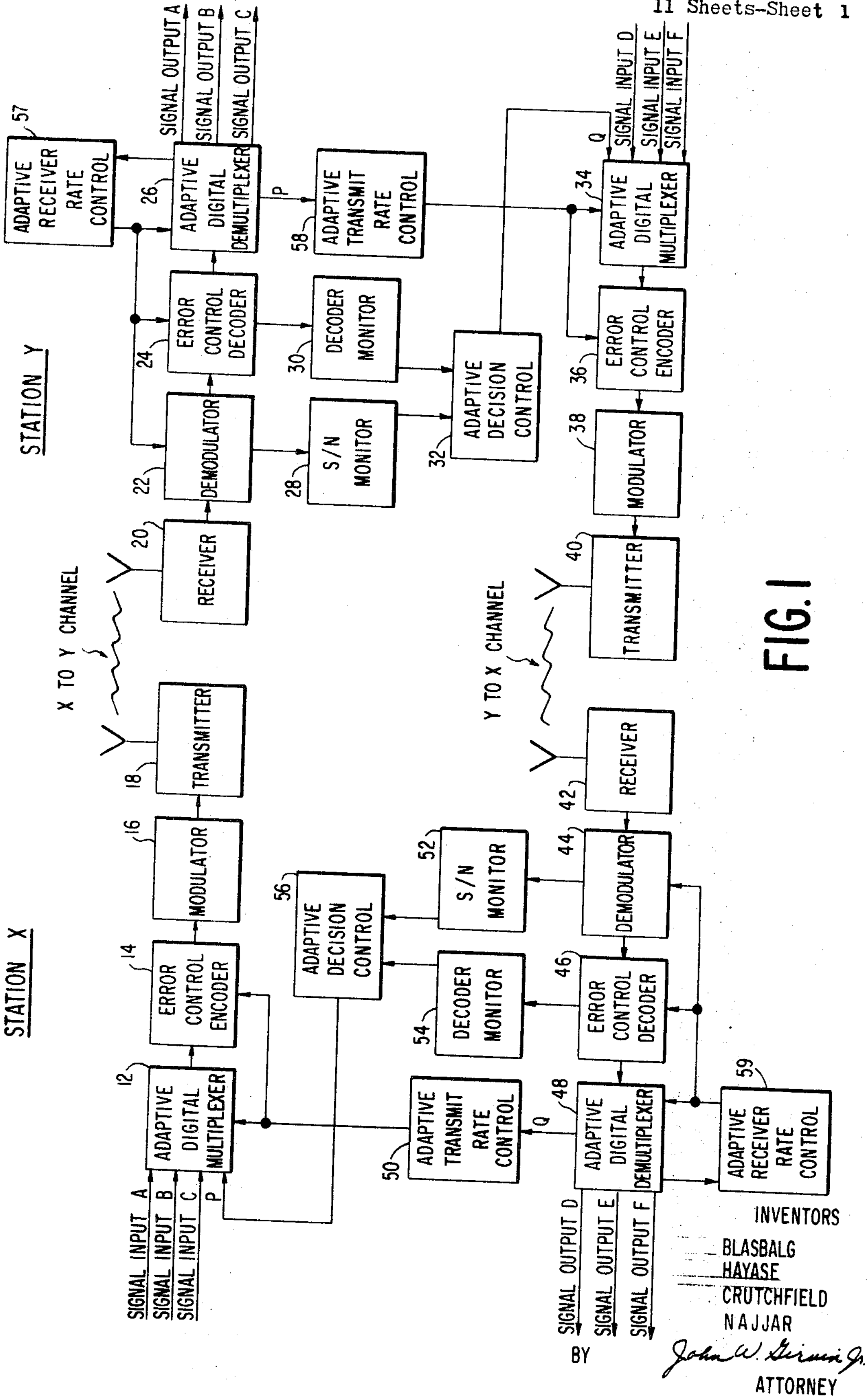
FIG. 1 is a block diagram of a full duplex adaptive digital communications system.

Referring now to FIG. 1, the full duplex adaptive digital communication system has two identical stations X and Y. Each station has both a transmitter for transmitting information to another station and a receiver for receiving information from the other station. Each station receives information to be transmitted to the other station from users through signal input lines such as signal inputs A, B, and C at station X and signal inputs D, E, and F at station Y. Each of these inputs may have the same data rate or a different data rate as any other input. Each input at every station is further assigned a priority relative to any other input at the same station in accordance with the desires of the users. Each station has an adaptive digital multiplexer 12 or 34 for multiplexing the signal inputs into a single output bit stream. Each of the adaptive digital multiplexers can be adapted to accept a varying number of inputs and produce a time division multiplexed output whose bit durations vary in accordance with system requisites. Each station also has an error control encoder 14 or 36 for encoding redundant bits into the time division multiplexed output of the adaptive digital multiplexers 12 and 34, respectively. Each station is also provided with a modulator 16 or 38 for modulating the encoded time division multiplexed signal onto a carrier wave to be transmitted. Transmitter devices 18 and 40 are provided at each station for transmitting the modulated encoded time division multiplexed wave to the other station.

The receiver portion of each station consists of a receiver 20 or 42 for receiving the transmitted wave from the other station. A demodulator 22 or 44 is also provided at each station to demodulate the incoming waveform (e.g., separate the carrier wave from the encoded time division multiplexed signal). Each station also has an error control decoder 24 or 46 for decoding the encoded time division multiplexed signal. The decoder is capable of correcting bits received in error within the capability of the error control code. Each station is further provided with an adaptive digital demultiplexer 26 or 48 which demultiplexes the time division multiplexed signal into a plurality of output signals which are identical with the input signals which were supplied to the other transmitting station.

In order to adapt to varying environmental conditions, each station is supplied with a signal-to-noise monitor 28 or 52 and a decode monitor 30 or 54. The signal-to-noise monitors 28 or 52 monitor the incoming signal, and supply an output which is indicative of the signal-to-noise ratio of the incoming signal. The decode monitors 30 or 54 monitor the decoding operation, and supply an output signal indicative of the number of bits which were improperly received and detected by the error control decoders 24 or 46. Each station is supplied with an adaptive decision control 32 or 56 which is responsive to its respective signal-to-noise monitor and decode monitor. Whenever the signal-to-noise ratio decreases beyond a preset limit and/or the decode monitor indicates that the error rate is exceeding a preset limit, the adaptive decision control supplies an output to be sent to the other station, informing the other station to increase the energy of each bit transmitted. Each station has an adaptive transmit rate control 50 or 58 which recognizes the signal sent by the adaptive decision control of the other station. Upon receipt of such a signal, the adaptive transmit rate control causes inputs from low priority users to be deleted, causes the adaptive digital multiplexer to transmit at a lower bit rate pulses having longer bit durations, and causes the error control encoder to adapt to the reduced bit rate of its associated adaptive digital multiplexer. The adaptive transmit rate control also provides an information input pulse informing the other station that it is adapting to a lower bit rate. Each receiving station has an adaptive receiver rate control 57 or 59 which recognizes this information pulse and in response thereto, causes the demodulators, error control decoders, and adaptive digital demultiplexers of the receiving stations to adapt to the new transmission rate.

For the purposes of illustrating how the system shown in block form in FIG. 1 operates, it will be assumed that it is desired to transmit signal inputs A, B, and C at station X to station Y. As mentioned previously, each of these inputs is assigned a priority by the users of the system. It will be assumed that signal input A has been assigned the highest priority while signal input C has been assigned the lowest priority. Furthermore, as noted before, each input may have an information rate which is the same as or different from any other input. It will be assumed that the information rates of both input A and input B are three times the information rate of input C. It will further be assumed that the rate of control input P is the same as that of input C. These inputs are presented to adaptive digital multiplexer 12 which multiplexes them into a single time division multiplexed output. Accordingly, signal inputs A and B appear three times each within a single time frame, while inputs C and P appear once each within the same time frame. Thus, there will be eight time slots within a single frame, three of which will have information from signal input A, three of which will have information from signal input B, one of which will have information from signal input C, and one of which will have information from control signal input P. For purposes of illustration, these time slots will be arranged in the following sequence: A, B, P, B, A, C, A, B. It is to be noted that the control singal input P is also of high priority. Thus, it can be seen from the above sequence that high priority inputs are alternated with low priority inputs. This is done to provide ready input decoupling as will be explained later on.

The time division multiplexed output is then provided as an input to error encoder 14 wherein redundant bits are added in accordance with the type of error encoding desired. The signal output of the error encoder is then modulated at modulator 16 and transmitted by transmitter 18 to receiver 20 of station Y. The received signal is demodulated at demodulator 22, decoded at error control decoder 24, and demultiplexed by adaptive digital demultiplexer 26 into signal output A, signal output B, signal output C, and control output P. These output signals are identical with their respective input signals at station X. The signal-to-noise ratio of the received signal is monitored by signal-to-noise ratio monitor 28. Also, the decode monitor 30 monitors the number of errors in the received signal which are corrected by the error control decoder 24. When the transmission media becomes extremely noisy, the signal-to-noise monitor 28 will present an output indicative of the low signal-to-noise ratio of the received signal. Similarly, the decode monitor 30 will present an output indicative of a higher error rate due to the noisy environment. When the error rate exceeds a preset maximum and/or the signal-to-noise ratio is lower than a preset minimum, adaptive decision control 32 supplies an output on line Q requesting transmitting station X to increase the energy of the transmitted signal. When environmental conditions are not affecting the signals sent by transmitter 18, the output on line Q indicates that station Y is receiving the information transmitted and that adaptive measures are not necessitated. The singal appearing on line Q is multiplexed with signal inputs D, E and F in the same manner as control signal P is multiplexed at station X with inputs A, B, and C. Signal Q is received, demodulated, decoded, and demultiplexed at station X in the same manner as signal P is received, etc. at station Y. The control signal Q informs adaptive transmit rate control 50 whether or not it is necessary to decrease the transmission rate and increase the bit duration, thus increasing the energy per bit of the transmitted signal. When it is necessary to increase the energy per bit of the transmitted signal, adaptive transmit rate control 50 uncouples the inputs having the lowest priority and controls the adaptive digital multiplexer so that it will multiplex the high priority signals remaining into a time division multiplexed output having a bit duration greater than that previously transmitted. The adaptive transmit rate control also conditions error control encoder 14 to accept an input having a slower bit rate and in addition causes a signal to be transmitted by transmitter 18 informing reciving station Y that station X is adapting. This signal is decoded by adaptive receiver rate control 57 which then causes the receiving station's demodulator, decoder and demultiplexer to adapt to the new transmission rate.

For purposes of illustration, it will be assumed that when an adaptive decision is made, the transmission rate will be halved and the bit duration will be doubled. In the present example, there were eight time slots per time frame. In order to halve the bit rate, it would be necessary to provide only four time slots per time frame (the time duration of the time frame remaining constant). Control input P having one time slot per time frame, has top priority and must remain. Thus, three time slots would be left for the remaining signal inputs. Signal input A, having the next top priority, fills these remaining three time slots. Thus, signal inputs B and C having the lowest priority will be decoupled from the adaptive digital multiplexer 12. It was earlier assumed that the time slot sequence was A, B, P, B, A, C, A, B. It is to be noted that every other pulse in the sequence is a high priority pulse, while the remaining pulses are of low priority. Thus, when inputs B and C are deleted, the time slot sequence would A, 0, P, 0, A, 0, A, 0 (i.e., with 0 denoting blank). It can readily be seen that if the bit duration of the remaining pulses were doubled, no information would be lost since the A and P inputs would expand into blank slots. Thus, a time division multiplexed signal having an information rate one half of that previously sent and a bit duration of double that previously sent is presented at the output of digital multiplexer 12. This signal, when transmitted, presents twice the energy per each transmitted pulse thereby maintaining the energy-to-noise power density ratio of the received signal at station Y to that previously received prior to adapting.

It can be seen from FIG. 1 that the general system block diagram of each station consists of a number of subsystems. The following is an index which will describe where the detailed description of each of the major subsystems is located within the patent specification.

| SUBSECTION | Column No. |
|---|---|
| Inputs and Formatting | 6 |
| Adaptive Digital Multiplexer Subsystem | 8 |
| (1) Format computer | 9 |
| (2) Input interface | 10 |
| (3) Combiner | 12 |
| Error Control Encoder Subsystem | 16 |
| Modulator Subsystem | 18 |
| Demodulator Subsystem | 18 |
| Error Control Decoder Subsystem | 20 |
| Adaptative Digital Demultiplexer Subsystem | 21 |

DETAILED DESCRIPTION

Inputs and Formatting

Prior to entering into a detailed discussion of the preferred embodiment of this invention, it will be necessary to discuss the types of inputs presented to the multiplexer and the type of format control necessary to achieve a time division multiplexed signal which can readily be adapted into a signal having longer bit duration and a slower bit rate. As mentioned before, each input of the system may have the same bit rate or a different bit rate as each other input to the system. It will, however, be assumed that each input is at a bit rate which is a specified multiple of a predetermined number. For those inputs which do not have a bit rate which is a multiple of the predetermined fixed number, a special non-standard rate conversion unit will be utilized to convert the rate of those inputs into the sum of multiples of the preselected number. This non-standard conversion unit will be discussed in copending application entitled Rate Conversion System, filed by Joshua Y. Hayase, this same day and assigned to the assignee of the present application. Thus, for the purposes of illustration, all inputs to the adaptive digital multiplexer to be discussed hereinafter will have a bit rate of $2^n \times 75(1+k)$ bauds.

Summarizing, the two factors which we will consider here enter into the optimum design approach which makes the design of the adaptive digital multiplexer more complex than the non-adaptive or conventional time division multiplexer. They are:

(1) The multiplexer must be adaptive in the sense that the final output bit rate must vary as transmission link conditions vary and, (2) The inputs are not all at a common rate but are at rates related by $2^n \times 75(1+k)$ bauds.

The influence of these two factors will now be considered.

The problem of combining bit streams of different rates is simplified by the fact that any allowable bit rate $R_n$ is related to a basic rate $R_o$ by the relation:

$$R_n = 2^n R_o \quad (1)$$

Assume that the inputs to be multiplexed consist of $K_n$ lines operating at each bit rate $R_n$. That is, there are:

$K_0$ lines at the rate of $2^0 \times R_o$
$K_1$ lines at the rate of $2^1 \times R_o$
$K_n$ lines at the rate of $2^n \times R_o$ The binary data on the set of lines $(K_n)$ is to be combined by time division multiplexing into a single bit stream of $2^l \times R_o$, the rate which the link can support. If the lowest input rate is $2^0 \times R_o$, then the time division multiplex (TDM) frame resulting from the combining will have a time duration of $$T_f = \frac{1}{2^0 \times R_o}$$

since each frame must contain one and only one bit from the lowest rate input. The TDM frame will therefore consist of $$\frac{2^l R_o}{2^0 R_o} = 2^l$$

time slots. Of these $2^l$ time slots, an input of rate $2^n \times R_o$ will require $$\frac{2^n \times R_o}{2^0 \times R_o} = 2^n$$

slots. Since $K_n$ lines are operating at the rate $2^n \times R_o$, then $2^n \times K_n$ time slots in the TDM frame are needed to accommodate these lines. These slots can be arranged in any manner in the TDM frame to achieve the required multiplexing. The only basic requirement is that the numbers $(K_n)$ satisfy the relation $$\sum_{n=0}^{l-1} K_n 2^n \leq 2^l \quad (2)$$

That is the number of slots required to accommodate all of the inputs must not exceed the total number of slots.

Figure 3:
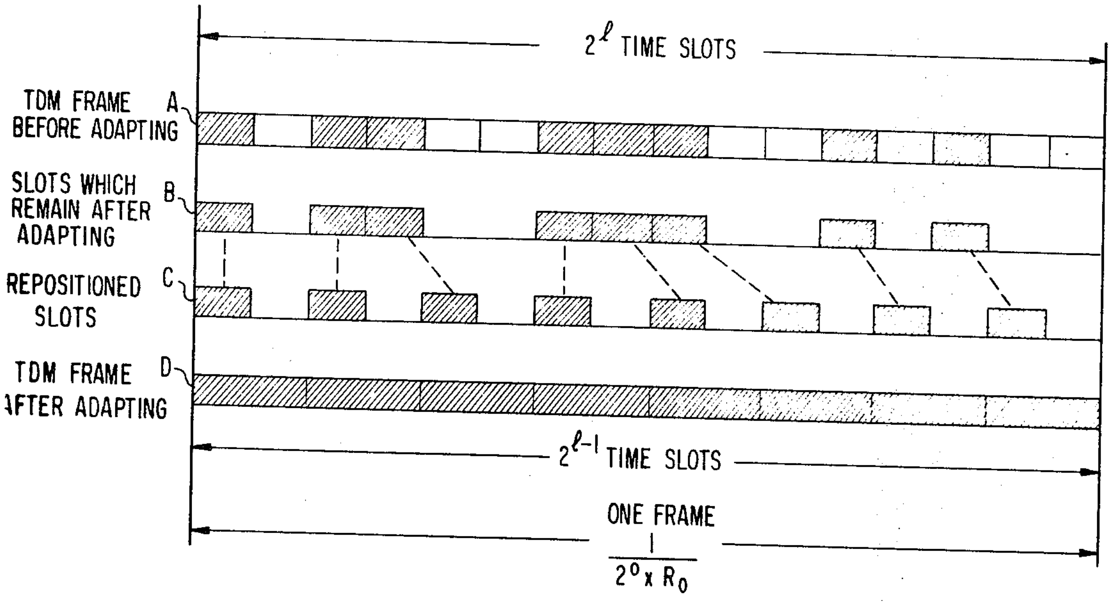
FIG. 3 is a timing diagram showing the reformatting required when using arbitrary slot assignments in the adaptive multiplexer.

Adapted is accomplished by halving the output bit rate (i.e., lowering $l$ by 1). This means that the frame after adapting contains $2^{l-1}$ slots instead of $2^l$. Equation 2 will therefore not always be satisfied since $l$ is subject to change due to varying link conditions and the $K_n$'s are fixed and are functions of the input traffic requirements. The only way to satisfy Equation 2 for a given $l$ is to reduce the $K_n$'s by cutting off service to selected input lines. The problem of deciding which lines to drop as $l$ varies, is an additional requirement of the adaptive digital multiplexer and influences the method of assigning the TDM frame slots. The exact technique of deciding which slots are to be dropped each time adapting takes place will be considered in a later section. It suffices at this point to assume that selected inputs will be dropped from service each time the output rate is halved. The purpose of halving the output rate is to double the integration time required to detect each bit. If the time slots are originally assigned in an arbitrary way, then when the adapting takes place and the required bits are dropped, the resulting frame would have to be reformatted in order to double the width of each remaining bit. Referring now to FIG. 3, a timing diagram showing the reformatting required when using arbitrary slot assignments is shown. Signal waveform A represents a TDM frame before adapting. The shaded time slots represent information having high priority which will remain after adapting. It is seen that these time slots have been arbitrarily placed with respect to the low priority non-shaded time slots. Signal waveform B shows the slots which remain after adapting. Signal waveform C shows how these slots must be repositioned in order that the bit duration of each slot can be doubled. Signal waveform D shows the TDM frame when it has been adapted by doubling the bit duration. If reformatting can be avoided every time adapting is required, then the design of the adaptive digital multiplexer and corresponding demultiplexer can be simplified. Reformatting can be avoided by employing a systematic technique for assigning the TDM slots.

Two methods of systematically assigning the TDM slots are illustrated in FIG. 4. In FIG. 4(*a*) the method shown is to alternate the bits which are to remain after adapting (A1, A2 . . . A8) with those which are going to be dropped (B1 . . . B8) This is shown in signal waveform E. To adapt, the (B1, B2 . . . B8) bits are dropped from the frame and the width of the remaining bits is doubled as shown in signal waveform F. The method shown in FIG. 4(*b*) is to assign the bits (A1, A2 . . . A8) to one half of the frame and the remaining bits to the other half of the frame as shown in signal waveform G. To adapt, half of the frame is dropped and the duration of the remaining bits is doubled to fill up the frame as is shown in signal waveform H.

Of the two techniques, the alternating method is more desirable because the bits from each input can occur at the same rate in the TDM frame as in the input (only the bit duration is changed). However, in the bunching method, the rate of occurrence of bits in the TDM frame is greater than the input bit rate. Hence, this technique would require a buffer of length $2^n$ for each input rate of $2^n \times R_o$.

The problem of deciding which inputs to drop each line $l$ is changed can be solved by establishing a prearranged hierarchy of channel users. The position of each line in the hierarchy is determined by the rate of the line and its priority. The convention being that the higher the position occupied by an input line in the hierarchy the least likely that line is to be cut off.

It is obvious that the higher the priority of a line the higher its position in the established hierarchy. For inputs of equal priority, the lower rate lines could occupy a higher position. A low rate would take precedence over a higher rate since the higher rate takes up more of the frame. Thus, the choice between servicing many low rate channels or a few high rate channels all of the same priority would be made in favor of the low rate channels on the basis of servicing as many inputs as possible. The hierarchy can also be arranged such that a particular input (or inputs) will not be dropped as long as the link rate can support it.

ADAPTIVE DIGITAL MULTIPLEXER SUBSYSTEM

The previous section has outlined the essential requirements upon which the design of the adaptive digital multiplexer is based. It has been shown that two requirements are essential to the design of an adaptive digital multiplexer:

(1) A systematic method for assigning TDM slots and dropping out slots as needed for adapting, and (2) A method for determining the preferred precedence for dropping-off service.

A functional block diagram of the basic subunits essential for the design of an adaptive digital multiplexer is shown in FIG. 5. There are three basic subunits which are needed to fulfill the requirements discussed previously.

The input interface unit 102 forms the interface between the various input lines and the multiplexer. It provides the multiplexer with inputs which have common logic levels. This unit must provide A–D conversion for analog inputs when needed and also provide for the routing of each input line to the proper unit of the adaptive parallel bit stream combiner 104. The routing information is received from the format computer 106.

The adaptive parallel bit stream combiner accepts the binary inputs of various rates and multiplexes them into a single binary signal of rate and format dictated by the format computer 106.

The format computer controls the format of the final multiplexed output by controlling the input interface unit and the adaptive parallel bit stream combiner. The format is determined from externally supplied status information (i.e., rate and priority of each input) and link rate.

(1) Format computer

The role of the format computer in the adaptive digital multiplexer is to establish the best TDM format for the given traffic input conditions to the multiplexer and the link rate available. Once the format is established, the format computer must supply the proper information to the input interface units and adaptive combiner to perform the required routing and combining.

The status of the input traffic can be made available to the format computer in a variety of ways. The simplest way would be via manual switches on a control panel at the transmitting station. The switches would contain the rate and priority information for each line and would be set up and changed on an operational basis. In cases where the transmitting station is working in conjunction with an automatic digital message switching center, much or all of this information concerning the input traffic would be available from the computers at those centers.

The actual unit used for the format computer will depend on the application. It may be a special purpose computer designed for the transmitting station or it could be a software addition to the existing computers at automatic digital message switching centers.

The format computer design is based on the computational procedure it must perform, which is quite simple, consisting of the following: For each input line, the computer has the rate and priority available. From this, the following information can be computed for each rate.

(1) The total number of inputs $K_n$.

(2) The number of inputs at each priority level $P_n^{(0)}$, $P_n^{(1)}$, $P_n^{(2)}$, . . . $P_n^{(m)}$ where $P_n^{(i)}$ is the number of users at priority level $P^{(i)}$ operating at the rate $2^n R_0$. The number of priority levels $m$ is governed by the users serviced by the transmitting station. The format computer also has available the usable link rate $2^l \times R_0$, i.e., it knows $l$.

The format computer next determines how much of the traffic the link can support. This is done by finding out if the number of time division multiplex (TDM) frame slots is sufficient to accommodate the total number of bits. The computational procedure for this shown in FIG. 6.

Starting at block 201 with the highest priority $P_n^{(0)}$ derived from traffic status inputs, the number $N_0(j)$ is computed at block 209.

$$N_0(j)=2^l-\sum_{n=0}^{j}2^n P_n^{(0)}\quad j=0,\ 1\ ..\ l-1$$

As shown at block 211, $N_0(j)$ is tested to see if it is greater than 0. If $N_0(j)>0$ for some $j\leqq l-1$ then all inputs of $P^{(0)}$ priority up to and including the rate $2^j\times R_0$ can be accommodated. If $N_0(j+1)<0$ while $N_0(j)>0$ then as shown at block 213, the $P_{j+1}^{(0)}$ must be decreased to $$\hat{P}_{j+1}^{(0)},\ \text{where}\ \hat{P}_{j+1}^{(0)}=N_0(j)\times 2^{-(j+1)}$$

The computation would cease at this point as indicated at block 215. The link would be able to accommodate $P_n^{(0)}$ users up to the rate $2^j\times R_0$ (i.e., $n=0$ . . . $j$) and $P_{j+1}^{(0)}$ users at the rate $2^{j+1}R_0$.

If on the other hand $N_0(j)<0$ for $j$ up to $l-1$, then all the $P^{(0)}$ priority traffic will pass and the next priority level $P^{(1)}$ traffic is tested. This is done by computing $N_1(j)$. Thus, as shown at blocks 217 and 219 where $j$ is increased by 1 and blocks 221 and 223 where $m$ is increased by 1.

$$N_1(j)=2l-\sum_{n=0}^{1-j}2^n P_n^{(0)}-\sum_{m=0}^{j}2^m P_m^{(1)}$$

$$=N_0(l-1)-\sum_{m=0}^{j}2^m P_m^{(1)},\ j=0,1\ldots-1$$

$N_1(j)$ is tested similar to $N_0(j)$. This process is continued forming $N_2(j)$ etc., if necessary, until an $N_m(j)$ is found for which $$N_m(j)\geqq 0\ \text{and}\ N_m(j+1)\leqq 0$$

For this $j$, $P_{j+1}^{(m)}$ is set equal to $N_m(j)\times 2^{-(j+1)}$ and all remaining traffic is cut off.

Once the allowable $P_n^{(m)}$'s are found, the format computer next determines from $P_n^{(m)}$'s the routing information. This is done by routing those lines corresponding to $P_0^{(0)}$ lines of $2^0\times R_0$ rates and highest priority to the $P_0^{(0)}$ inputs of the combiner which corresponds to the last TDM slots to be dropped. Then the $P_1^{(0)}$ inputs of rate $2^1\times R_0$ and priority $P^0$ are routed to the $P_1^{(0)}$ inputs of the combiner which corresponds to the TDM slots which are next to last to being dropped. This process continues until all lines corresponding to the allowable $P_n^{(m)}$'s are routed.

From the allowable $P_n^{(m)}$'s and in conjunction with the routing information, the control signals for the adaptive combiner are derived.

It is not necessary for the format computer to perform the above iterative solution each time $l$ changes. It is only necessary if a change in the input traffic status has occurred since the last format was derived. If the traffic has not changed, the format for the new rate has already been established since the design proposed for the adaptive combiner is based on a systematic technique for adapting.

(2) Input interface unit

As mentioned before, the input interface unit forms the interface between the various lines and the multiplexer. This unit consists of a plurality of input/output interface devices. Data sources provide both information and timing pulses to the adaptive TDM terminal via the input/output interface devices; the timing pulses may derive from the clocks that are either synchronous or asynchronous.

If the clocks are synchronous, then their timing pulses are assumed to be in phase with each other as if derived from a common source. Consequently, one can assume that the data sources provide synchronous bit rates that can be combined without the need of buffer. This is true only if the incoming data is free of bit fluctuation or is within the fluctuation tolerance of the data modem at the receiver (decombiner). Therefore, any sampling technique used by the adaptive TDM terminal to strobe out the data and interleave it will not require a buffer store in the I/O ID (between the data source and the combiner). This conclusion rests on the assumption that the interleaving clock in the combiner is highly stable and derived from the data source so that the combined bit rate is synchronous.

If the clocks are asynchronous, they are independent of each other and out of phase. To successfully sample the incoming data and interleave it synchronously, a buffer must be provided for each channel. The size of each buffer for a given bit rate depends upon the instability of the clock in the data source associated with that channel, and also on the length of data block (message length. If the instability is Δ and the message length in seconds is T for a bit rate of R bits per second, then the buffer capacity C in bits can be expressed as $$C=2(RT)\Delta$$

since the instability implies that data fluctuation is either fast or slow. This way the buffer will not overflow (fast case) and, also, that holes will not be strobed to the combiner (slow case). The discussion on the "buffer" at the end of this section illustrates how this is accomplished.

if:

$R=2400$ bits per second (bit rate)
$T=30$ minutes (message length)
$=60\times 30$ seconds
$\Delta=1$ part in $10^5$ or $1\times 10^{-5}$ then:

$$C=2(2400\times 60\times 30)\times 1\times 10^{-5}$$
$$=86.4 \text{ bits}$$

and the required buffer capacity, to the nearest integer, is 87 bits.

For a fixed message length the only way to cut down the buffer size is by specifying a small value for Δ, which means, provide a highly stable clock. For very stable clocks the size of the buffer will be a single bit at most. From a design standpoint, a single-bit buffer is required even for the most highly stable clock. The reason for this one-bit buffer is that the combiner sampling clock is generally not in phase with the clock used to strobe in the data from the line.

Referring now to FIG. 7, a block diagram of an input/output interface device is shown. It consists of a (2RTΔ)-bit shift register 301, a bit-position identifier 303 and bit position detector 305 and collector logic 307. The incoming data from the line modem 309 is converted to the proper level by level converter 310 and is strobed into the register 301 by means of the receive serial clock provided by the modem 309. The trailing edge of this clock pulse, positioned at or near the center of a bit, shifts the data through the register. The same transition in this clock is used to step up the bit-position identifier 303 so that every time a bit is shifted in the register the identifier indicates the position of the oldest bit. When the register is full of half its capacity (RTΔ), the periodic time slots provided by the combiner 311 for this channel are turned on to step down the identifier at the trailing edge of a 50 percent duty cycle clock derived from these slots. The output of the identifier is then decoded in the bit-position detector 305.

Each decoded word that identifies a bit position in the shift register is used as a control to enable or disable an AND gate in the collector logic 307, each AND gate corresponding to a bit position in the shift register. Only one AND gate is enabled at a time and, therefore, data is extracted from different bit positions of the register and at the rate of the combiner periodic time slots. The outputs of the collector AND gates are then directed through an OR gate to form a serial bit stream that is multiplexed with other channels in the combining matrix. The operation is initiated when the data starts coming on the line.

When the line is idle (no data), the bit-position identifier 303 indicates position 1. When the line is active, the incoming data are strobed into the register and every time a new bit is strobed in, the identifier is incremented by one step. The combiner clock, meanwhile, is inhibited from decrementing the identifier until half of the register is full. When the register is half full, the identifier indicates bit-position $RT\Delta+1$. When this position is detected, the combiner sampling clock is turned on to step down the identifier to position RTΔ. This position, then, provides a pulse that enables the appropriate gate in the collector logic 307. At that time, a slot from the combiner will be available to extract the first bit from position RTΔ. Now if the incoming data is faster than the sampling (combiner) clock, the other half of the buffer which is empty will accommodate the fast rate for the duration of message length T; thus no data will be lost. The bit-position identifier 303 will always track the data and provide the control to strobe out the bit which has arrived first. If the incoming data is slower than the sampling clock, then the fact that half the register is full guarantees that a bit will always be available to strobe out. The identifier will always indicate the correct position from which a bit should be extracted, thus eliminating the possibility of strobing holes instead of data. Hence, the data is sure to be available for interleaving at all times whether the incoming rate is fast or slow.

The termination procedure takes place at the end of the message length T and only after the register is completely empty. At that time, the bit-position identifier is back to position 1, and therefore, the combiner clock is inhibited. If no more data is coming, the identifier remains in this position, ready for the next transmission to take place. When that happens, the procedure of processing data in the interface buffer is repeated in accordance with the above discussion.

(3) Adaptive combiner

The adaptive combiner is the key subsystem of the adaptive digital multiplexer. This unit provides a systematic combining of inputs of rates given by $2^n\times R_0$ in such a manner that adapting by deleting selected inputs can be easily achieved. The presence of the input interface unit guarantees that all inputs to the combiner will be at the proper rates and timed to a common source. The information required by the adaptive combiner to format the combined bit stream is derived in the format computer. As shown previously, the best technique for combining the inputs is one which enables interleaving inputs of various priorities. As an example of how this can be accomplished, a switching matrix device will be described. It is recognized that several other different techniques can be utilized to accomplish the same result.

The switching matrix performs the function of gating the data from an input into the proper TDM slot. The TDM slots are generated sequentially; therefore, the switching matrix merely samples the proper combiner input at the proper time. The switching matrix logic is governed by the formatting scheme used and the traffic status. It has been pointed out that the best approach to a format is based on adapting by deletion of every other slot. Hence, the slot assignment performed by a switching matrix should be based on this approach. To do this, the switching matrix must implement the following operations:

If the output rate is at $2^l\times R_0$ then there are available $2^l$ slots which can be numbered sequentially by:

$$S_1,\ S_2,\ S_3\ .\ .\ .\ S_{2^l}$$

To adapt to a new rate $2^{l-1}$ every other slot is deleted as in FIG. 4(*a*) and the remaining slots doubled in width. In terms of the original slot number sequence, the following slots remain $$S_1,\ S_3,\ S_5\ .\ .\ .\ S_{1+2j}\ .\ .\ .\ S_{2^l-3};\ j=1,\ 2\ .\ .\ .\ (2^{l-1}-1)$$

If we adapt again to a rate $2^{l-2}$ by again deleting every other slot, then the following original slots remain:

$$S_1, S_5 \ldots S_{1+4j} \ldots S_{2^l-3}$$

$$j=0, 1, 2 \ldots (2^{l-1}-)$$

In general, if adapting occurs $m$ times, the slots of the original which remain are, $$S_{1+2^m xj}$$

where $j=0, 1, 2 \ldots (2^{l-m}-1)$

The output rate is $2^{l-m}$ so that each remaining slot has been increased in width by $2^m$.

Consequently, if an input is to remain in service after adapting has occurred $m$ times, it must be assigned into slots $$S_{1+2^m xj}$$

in the original frame. The switching matrix logic must incorporate the above in its assignment procedure.

The rate of an input also influences the slot assignment procedure of the switching matrix. An input of rate $2^n \times R_o$ will require $2^n$ slots in the frame. To avoid buffering, it is necessary that the slots assigned occur in the same rate as the rate of the line. Hence, if a line of rate $2^n \times R_o$ is assigned into the slots which are to survive $m$ adaptings (i.e., $$S_{1+2^m xj}$$

and the first slot assigned is $$S_{1+2^m xj1}$$

then the succeeding slots assigned are obtained as follows:

The time interval between the first assigned slot $$S_{1+2^m xj1}$$

and the next is $$\frac{1}{2^n \times R_o}$$

The original slots are of width $$\frac{1}{2 \times R_o}$$

Hence, $2^{l-n}$ original slots occupy the interval between successive bits. Consequently, the original slots assigned to input of rate $2^n \times R$ are $$S_{1+2^m xj+(2^{l-n})j}$$

where $j=0, 1 \ldots 2^n$.

The slot assignment procedure above could be implemented directly into a switching matrix. The information which controls the assignment of a line, that is, the starting slot for each line and the number of times adapting can occur ($m$), is received from the format computer in terms of the number of lines at each rate and each priority. The switching matrix would then have to decode this information into the preferred slot assignment information. An alternative approach is to implement the switch matrix manually by means of a patch panel. The programming of the patch panel is then done in accordance with the above procedure which will now be described.

For purposes of illustration, it will be assumed that the maximum combined bit rate that the link can support is $2^6 \times 75$ b.p.s. As mentioned before, the assignment of TDM slots to specified input lines based on the line rates and priorities is the function allotted to the format computer. In the present design example, the format computer does not exist as an actual subsystem. It is assumed that the format is computed either manually or by use of a computational facility if available. The procedure used will be in accordance with that discussed previously.

Knowing the slot assignments, the next problem is to have logic that will generate the necessary slots and also some circuitry by which each line can be assigned to the proper slot or group of slots according to the prescribed format. The necessary logic to perform this is described below.

Referring now to FIG. 8, a block diagram of a switching matrix combiner utilizing a patch panel is shown. This combiner consists of a line slot generator 350, a slot decoder 352, a patch panel 354, AND circuits L1–L8, and summing circuits 360–366. A plurality of input/output interface devices 356 are also shown.

The line slot generator is a six-bit shift counter that is capable of generating up to $2^6$ discrete pulses within a frame. The frame duration which we have selected corresponds to the longest bit duration or the slowest bit rate; namely $$\frac{1}{75(1+k)}$$

The logic that controls this generator is such that any number of slots that is multiple of 2 can be generated. The frequency of the shift pulse that runs this generator is $$2^l \times 75(1+k) \text{ for } 0 \leq l \leq 6$$

The value for $l$ during any given transmission depends on the transmission link capacity. The flexibility for switching from one frequency to another is incorporated into the design so that when the adapting procedure takes place and the transmission rate through the transmission link is to be reduced, the shift pulse rate will be dropped accordingly. This can easily be accomplished if all these clocks at different frequencies are brought to the input of this generator, each through a separate gate controlled by a signal that enables the gate when it is called for. Only one of these gates will be enabled at a time and therefore only one frequency will be used during a given transmission.

Another input to this generator is the control input that will determine how many slots to generate during a given transmission. This is determined by the frequency of the shift pulse and the duration of the frame and is for a link rate $2^l \times 75(1+k)$.

$$\frac{2^l \times 75(1+k)}{75(1+k)} = 2^l$$

Several gates will be controlling this input. Again, only one gate is enabled at a time to allow the generation of the appropriate number of slots to accommodate the lines to be serviced and their rates within the channel link capacity. When adapting is to take place, requiring reduction in the rate of data transmission, then the gate that was formerly generating the higher number of slots will be inhibited and the gate that will allow the generator to produce fewer slots will be enabled.

As one can see from the above, when the adapting procedure takes place two things will be changed in the input of the slot generator: (1) the frequency of the shift pulse, and (2) the number of slots to be generated. The control signals that regulate and decide which gate to open and which one to close come from the "adaptive transmit rate control" subsystem shown in FIG. 1. This is expected since the number of slots generated determines the transmission rate through the transmission link and is always kept within the specified limits, which are affected by the conditions of transmission.

Having generated the slots, the next thing to discuss is how they can be assigned to different lines. Referring once again to FIG. 8, it is seen that the output of the line slot generator 350 is decoded at slot decoder 352 to give $2^l$ distinct pulses; each of which, or a group of which, may be assigned to an input line from the input/output interface device 356. These slots are assigned by patch panel 354. The following is an example of how such an assignment is made.

Assume it is required to service the following number of lines and their rates:

4 lines designated by L1 through L4 at the rate $2_0 \times R$ where $R=75(1+k)$; one of these lines is the supervisory control input shown as input P at station X in FIG. 1;
1 line designated by L5, at the rate $2^2 \times R$;
1 line designated by L6, at the rate $2^3 \times R$.
1 line designated by L7, at the rate $2^4 \times R$; and
1 line designated by L8, at the rate $2^5 \times R$.

All lines will be assumed to have the same priority. Assume further that the transmission link can accommodate a rate of $2^6 \times R$.

Therefore, the above number of lines can be serviced only if the total combined bit-rate is within the link capacity. In other words, if the number of these lines and their rates represent a valid solution to the equation $$\Sigma k_n 2^n = 2^1$$

Since the transmission link capacity is approximately $2^6$, then the combiner will be sending bits to the error control encoder shown in FIG. 1 at a rate of $2^6 \times R$. Since this affects the slot generator 350 of FIG. 8, this means the shift pulse running the generator will have a frequency of $2^6$R. Therefore, the generator will produce $2^6$ slots within a frame of $1/R$ duration.

Having generated the slots, the next effort is to assign these slots to the lines in hand. Since all lines have been assumed to have equal priority, the slot assignment will be made such that lines will be dropped from service, starting with the highest rate, as adapting requires. Adapting is accomplished by dropping off every other bit and doubling the width of the remaining bits as discussed previously.

When the link rate is at full capacity there are $2^6=64$ slots available, designated $S_1, S_2 \ldots S_{64}$. To adapt to a link rate of $2^5 \times R$ the slots numbered $S_2, S_4, S_6 \ldots S_{64}$ will be dropped. There are $2^5$ which will be dropped. Line 8 (L8) which has a rate of $2^5 \times R$ will require $2^5$ slots in the TDM frame. Since L8 is the highest rate line and hence should be the first dropped, L8 will be assigned the slots $S_2, S_4 \ldots S_{64}$.

To adapt to a link rate of $2^4 \times R$ the following additional slots would have to be dropped: $S_3, S_7, S_{11} \ldots S_{63}$. There are $2^4$ (such slots which will exactly accommodate line 7 (L7)). This is true since it has a rate $2^4 \times R$ and hence requires $2^4$ slots. Since L7 is the next highest rate line it will therefore be assigned the above slots.

To adapt to a link rate of $2^3 \times R$ the additional slots $S_5, S_{13} \ldots S_{61}$ will have to be dropped. These represent $2^3$ slots and will therefore accommodate L6.

To adapt to a link rate of $2^2 \times R$ the additional slots to drop are: $S_9, S_{25}, S_{41}, S_{57}$. These slots will accommodate L5 since L5 has a rate $2^2 \times R$ and will therefore need to occupy $2^2$ slots.

The remaining slots are $S_1, S_{17}, S_{33}$, and $S_{49}$. The only lines remaining are L1, L2, L3 and L4 which are all at the rate $2^0 \times R$ and hence each requires only one slot in the TDM frame. Therefore, these lines will be assigned to the remaining slots. If the supervisory control input is L1, then L1 will be assigned to S1 since S1 will survive further adapting. The remaining assignments are arbitrary.

A summary of lines and their slot assignments is as follows.

| Line No.: | Slots assigned |
|---|---|
| L1 | $S_1$. |
| L2 | $S_{17}$. |
| L3 | $S_{33}$. |
| L4 | $S_{49}$. |
| L5 | $S_9, S_{25}, S_{41}, S_{57}$. |
| L6 | $S_5, S_{13} \ldots S_{61}$. |
| L7 | $S_3, S_7 \ldots S_{63}$. |
| L8 | $S_2, S_4 \ldots S_{64}$. |

A pictorial representation for assigning the slots to the lines appears in FIG. 9($a$). FIG. 9($b$) is the same as FIG. 9($a$) except for a reduced rate resulting from adapting. In FIG. 9($b$) L8 is missing as a result of adapting since it was of highest rate among the other lines. The basis for the slot assignment procedure used above was discussed previously.

The relationship for each line and its slots, can be implemented as shown in FIG. 10. This figure shows a "Patch Panel" 401 which has its back board wired to all the imputs of the combining matrix (each input is associated with a given line) and to all the outputs of the slot decoder 403 (with input from the slot generator 405). The front of the patch panel can be programmed according to the slot assignments. For example, line L1 is gated into slot $S_1$. Slot decoder 403 provides an output to pin S1 of patch panel 401 at $S_1$ time. Pin $S_1$ is connected to hub A1 of the patch panel. Hubs A1–A8 are connected to the combiner 409 so that hub A1 is connected to AND circuit 411. Line L1 is also connected to AND circuit 411. Thus line L1 is gated into slot $S_1$. Thus, the appropriate slots will be combined with the appropriate lines. The combining takes place in the combining matrix of FIG. 10. FIG. 11 shows the relative position of the slots on a per line basis. The output of each AND gate in the combining matrix feeds an OR gate 407 whose output represents the output of the combiner. It is important to note that the patch panel performs the dual function of routing inputs and setting up the slot assignments. These functions can also be performed electronically.

FIG. 8 shows how the slots are combined to make a line at the output of AND circuits L1 to L8 and how the lines are combined to form the output of the combiner in circuits 360–366. The various adaptive outputs are also shown.

Other versions for the manual approach, for example, include two patch panels at each transmitting station, both patch panels having their back board pre-wired, but only one of them will be programmed for specific input traffic conditions and "plugged in" during a given transmission. If the traffic conditions change, the other patch panel can be utilized to accommodate the change. However, the various traffic changes must be made known to each station sufficiently in advance so that the panels can be wired.

Another version would be to use a single patch panel but several combining matrices to allow for automatic changes in traffic status. This is used when the rates of lines do not change but their priorities do.

Thus, we have seen how the format computer, input interface unit, and adaptive combiner fit together to provide an adaptive digital multiplexer subsystem. Referring now to FIG. 1, it can be seen that the output of the adaptive digital multiplexers 12 and 34 is presented to error control encoders 14 and 36 respectively. It will be the purpose of the next section to describe how the error control encoder operates.

Error Control Encoder Subsystem

As noted before, each station is provided with an error control encoder to encode the message to be transmitted with redundant bits. The addition of redundant bits allows the system to operate within a fixed error tolerance. Further, it provides a safety margin to a slowly degrading communications link.

For example, assume that thermal noise is the only source which will cause random errors and furthei assume that the transmitted signal bits are of sufficient duration to overcome any such noise. In this situation, there would be virtually error-free reception of the transmitted signal. If the noise level should increase to a level which causes random error, the adaptive system described herein could increase the signal bit duration and thus adapt once again to virtually error-free reception. Since adapting takes a finite time and since it is desirous to have uninterrupted transmission, random noise induced errors would occur from the time that the noise level increased until the system was adapted to the longer bit duration. However, the addition of error control encoding supplies an added safety margin which allows the system to continue to operate with tolerable error in the ideal situation described.

The type of error control encoding utilized depends upon the tolerable error rate of the system. That is, a system would use many redundancy bits if virtually no errors could be tolerated and very few redundancy bits if many errors could be tolerated. Thus, it is clear that there are many different types of encoding schemes that could be utilized. Once the encoding scheme has been selected, it is only necessary to build an encoder which incorporates the selected scheme and which can be controlled to accept an input rate which changes when the system adapts to a different transmission rate.

Many prior art encoders can be adapted to accept such a changing input rate. Generally, such encoders are designed to accept input data at a fixed rate, add redundancy bits, and gate the data out at a higher rate. It is only necessary to control the rates at which the encoder accepts data and gates data out in order to form an encoder which will adapt to differing input rates.

FIG. 12 shows an example of how such an encoder can be constructed. For the encoder shown, the type of cyclic code used is equivalent to the Abramson code which has a total block length of 63 bits of which 56 are information bits. Thus, the generation of the parity bits requires a seven stage shift register 500 identified by the polynomial $1+X^2+X^6+X^7$ with binary coefficients 10100011. The encoder also consists of an output bit buffer 502, a six-bit counter 502, a six-bit counter 504, a decoder 506, timing logic 508 and control logic 510 for controlling the bit counter and for generating various timing signals, source control buffering 512 for buffering the input multiplexed digital data from adaptive digital multiplexer 12.

The significant point that should be observed in this subsystem is that the information leaves the encoder at higher rates than when it enters. This is because to every block of 56 bits entering this subsystem there corresponds a block of 64 bits leaving it. This means the addition of eight bits, seven being check bits and the eighth a control bit, forces the encoder to process the information at a faster rate. The out-going rates are 8/7 of the incoming data rates. If the rate of the incoming data from adaptive digital multiplexer 12 is $2^n \times R$, then that of the outgoing data rate to modulator 16 will be $$\frac{2^{n+3} \times R}{7}$$

Thus, it is necessary for the clock generator 508 which generates clock timing pulses at the rate of $$\frac{2^{n+3} \times R}{7}$$

to know R and $n$. This information is supplied by the adaptive transmit rate control 50.

The information through the encoder is processed such that the first 56 bits of each block are sent to the output buffer 502. These 56 bits are first gated by AND circuit 54 into OR circuit 520 and then into the output bit buffer. These first 56 bits are followed by seven redundancy bits which are gated by AND circuit 516 into OR circuit 520 into the output bit buffer. A single control bit used for subframe synchronization is generated by subframe generator 522 and gated by AND circuit 518 into OR circuit 520 into the output bit buffer. This bit follows the seven redundancy bits. AND circuits 514, 516 and 518 derive their timing inputs from timing and control circuit 524. This circuit is responsive to the six-bit counter 504 and the bit decoder 506. The latter circuit supplies an output indicative of the current bit slot.

Clock generator 508 controls the rate at which six-bit counter 504 steps. The counter in turn controls the rate at which the 56 information bits, the 7 redundancy bits, and the control bit are sampled and hence the output rate into output bit buffer 502.

Thus, when adaptive transmit rate control 50 indicates that the transmitting rate is to be changed, it sends a control pulse to adaptive digital multiplexer 12 which adapts in a manner discussed in a previous section by halving its output bit rate. Adaptive transmit rate control 50 also sends a control pulse to clock generator 508 of the encoder. This pulse causes the clock generator to decrement $n$ by 1. Thus, if the output rate of the multiplexer 12 was $2^n \times R$ and clock generator 508 was producing a clock pulse at the rate $$\frac{2^{n+3} \times R}{7}$$

the new adapted rates would be $2^{n-1} \times R$ and $$\frac{2^{n+2} \times R}{7}$$

respectively. This means that the 56 informations bits, the 7 redundancy bits and the control bit would be sampled at the new rate of $$\frac{2^{n+2} \times R}{7}$$

Hence, the error control encoder is caused to adapt to the new system transmission rate.

Referring once again to FIG. 1 it can be seen that the output of the error control encoder is modulated by modulator 16. The next section will discuss the unit.

Modulator Subsystem

Referring once again to FIG. 1, it can be seen that the signal bit stream leaving the error control encoder 14 or 36 is sent to modulator 16 or 38. There the information is combined with a carrier to facilitate transmission of the signal over the communication link.

There are many known prior art devices for modulating digital information. The type of modulator chosen will be governed by external constraints placed upon the system (e.g., cost, distance, efficiency, etc.). Hence, for example, it is possible to utilize PSK, DPSK or pseudo noise types of digital modulation techniques and modulators.

An example of the later type of modulation technique and modulator is shown in the following article. James C. Springett, "Pseudo-Random Coding for Bit and Word Synchronization of PSK Data Transmission Systems;" International Telemetry Conference, London, 1963; vol. 1, Conference Proceedings, Sept. 23, 1963, to Sept. 27, 1963; pp. 410–422. This type of modulator could be utilized in a satellite communications system. Once the information signal has been modulated, it is transmitted by transmitter 18 to the receiving station. The discussion which follows will discuss the details of the receiving station.

Demodulator Subsystem

Referring to the block diagram of FIG. 1, it is seen that the receiving station receives the modulated information signal at receivers 20 or 42. This signal is sent to demodulators 22 or 44 where the carrier is extracted from the information signal. The type of demodulator utilized, of course, depends upon the type of modulator chosen. However, regardless of the type of demodulator chosen, it should, unlike the modulator, be modified so that it operates efficiently in the adaptive system described.

For purposes of illustration, it will be assumed that the modulation technique described in the above-referenced article by Springett is to be utilized. Therein, the modulator accepts the serialized bit stream that has been encoded by the error control encoder. A pseudo noise (PN) sequence and clock signal is modulo two added to the data, and the resulting signal then bi-phase modulates the RF carrier. In the transmission mode, the data is combined synchronously with $PN\oplus 2f_s$ forming the output $$\pm PN\oplus 2f_s$$

where $\pm$ represents the bi-phase data modulation and $\oplus$ represents the modulo two addition. The signal is then fed into a balanced modulator and to the transmitter. Thus, the transmitted signal sidebands contain the power for the data signals and timing.

As described in the reference by Springett, the receiver first extracts the RF carrier and the bit timing clock which are used to lock-up local reference signals. The local references are then used to demodulate the received data. Since all the side-band power is put into the combined data and timing the available power is used efficiently and this is an important requirement in satellite communications.

The block diagram for extracting RF carrier is shown in FIG. 17. The output of the RF section 960 feeds a multiplier 962 into which the local reference $PN\oplus 2f_s$ is injected. When this signal is synchronous with the received component $+PN\oplus 2f_s$, the input to the IF 964 is $\pm f_0$, a bi-phase modulated carrier. In order to eliminate the bi-phase modulation due to the data, a squaring operation is performed by squarer 968. For this operation to be performed at a good signal-to-noise ratio an IF filter bank 966 is provided to match each data bandwidth. That is, there is a bandpass filter BPF and an associated gate G and an associated amplifier for each bit rate. The squared signal is bandpass limited by bandpass limiter 970 and divided by two by divider 972 and becomes the input to a phase lock loop. The frequency offset is obtained at the output of the VCO 974 and is used to compensate for the doppler effect apparent in satellite communications.

The clock pulse and the data are then extracted as described in the afore-referenced article by Springett. When the doppler frequency offset is removed, the input to the system is $\pm PN\oplus 2f_s$, and the data is removed prior to locking up the clock loop. The pseudo noise sequence is removed in two arms.

This system has been modified to provide a filter bank in lieu of each single bandpass filter shown in the two arms of the clock extraction circuit of FIG. 7 of the article by Springett. The filter banks consist of a bandpass filter for each signaling rate and are provided to build up the signal-to-noise ratio prior to multiplication. If T is the duration of a bit, the bandpass filter bandwidth is $B_w=2/T$. If the transmission rate is adapted in powers of two, then a general expression for the filter bandwidth is $2^{2n}/T$ where T is the maximum bit duration. The outputs of the filters in each arm are a double sideband suppressed carrier message signal at center frequencies $f_s$ and $2f_s$. The product of the two outputs removes the modulation and results in the clock frequency $f_s$. This clock pulse is then fed into a hard limiter and into a phase lock loop circuit. Once locked up, all the timing can be derived from the PNG, by detecting specific states using word detectors.

Thus, the demodulator has been modified by inserting three banks of bandpass filters for the single bandpass filters shown in the article. Referring once again to FIG. 17, it can be seen that each BPF in the IF filter bank is gated by a control line C1—C*n* and is operative only when gated by a pulse on its associated line. These lines C1—C*n* are gated by the adaptive receiver rate control 57 or 59 of FIG. 1 so that only one line C1—C*n* is gated at any one time in accordance with the data rate being transmitted. The other two filter banks are also similarly gated by the adaptive receiver rate control.

An additional modification that must be made to the demodulation is to provide timing consistent with the adaptive rates in the data detection circuit.

Thus, it can be seen that for the specific demodulator discussed, two changes were required to be provided:

(1) Timing consistent with adaptive rates is supplied to the data detection circuit, and (2) Filter banks are supplied so that a filter can be selected in accordance with the adaptive rate in order to improve the signal-to-noise ratio of the received signal. These two changes would be incorporated into any coherent demodulator utilized to provide an efficient system. For non-coherent demodulation, only the filter banks would be required.

Error Control Decoder Subsystem

An error control decoder is shown in FIG. 13. From the standpoint of synthesis and hardware requirements, the decoder is very much like the encoder discussed previously. The clock generator 601 is responsive to the adaptive receiver rate control 57 in the same manner as the clock generator of the encoder is responsive to the adaptive transmitter rate control. The six-bit counter 602, bit decoder 604, counter control 606 and timing and control 610 are identical to the corresponding units described previously with respect to the encoder.

Received information is sent from the demodulator 22 to receive buffer 608. The first 56 information bits are gated by AND circuit 626 into information bits buffer 612. The control bit is gated by AND circuit 628 into subframe bit buffer 614.

The logical circuitry of the shift register 600 is the same as that of the encoder. The content of the shift register 600 is monitored only at the end of 63 bits. If by this time the contents of the seven bits in this register are all zero, then the transmitted word is assumed to have been received correctly. On the other hand, if any of the seven bits are other than zero, this will indicate that an error has occurred.

From the standpoint of synthesis and hardware requirements, the decoder is very much like the encoder. The logical circuitry of the shift register is the same as that of the encoder. As one can see from FIG. 13 diagram, the content of the shift register is monitored only at the end of 63 bits. If by this time the contents of the seven bits in this register are all zero, then the transmitted word is assumed to have been received correctly. On the other hand, if any of the seven bits are other than zero, this will indicate that an error has occurred.

For single and double adjacent error correction, the outputs of the seven bits of this register are decoded to recognize the two binary patterns 0000001 and 0000011. Recognition of these patterns during the correction procedure, that is, when the contents of the shift register 600 and of the information bits buffer 612 are shifted, will indicate the need for correction to the control logic. The output of this control logic is "half-added" (Mod 2) by Mod 2 Add 630 to the shift information bits to complement the bits which are in error only. The output of Mod-2-half-adder 630 sends the stream of bits to the adaptive digital demultiplexer 624 for bit de-multiplexing via the output bit buffer 622. If the content of the shift register at the end of the fifty-sixth shift is still other than zero, then an error is recorded in the decode monitor 30 where errors are monitored and accumulated. If the accumulated errors which occur successively over a specified period of time exceed a certain number (to be specified), then a control signal is sent to the adaptive decision control subsystem 32. The latter subsystem in turn informs the transmitting end of the need to adapt. The question of how the transmitting end informs the receiving end and how adapting takes place is discussed later.

However, if the number of accumulated errors does not exceed the specified number within a given time, then these errors are ignored when the time is elapsed and the logic that monitors these errors is cleared. Retiming then starts over again when another error is detected after correction procedure takes place.

Adaptive Digital Demultiplexer Subsystem

Basically, the adaptive digital demultiplexer performs the inverse operations of the adaptive digital multiplexer discussed previously. Hence a considerable similarity in design with the multiplexer is evident. This section will discuss the demultiplexer utilizing the similarity aspects but pointing out any differences which do exist between the demultiplexer and the multiplexer.

The basic subunits necessary for the design of an adaptive digital demultiplexer are shown in FIG. 14. The three basic subunits shown are:

(1) Output Interface Unit 150,
(2) Adaptive Decombiner 152,
(3) Format Status Control 154.

The output interface unit provides for the proper interface between the demultiplexer and the various users. This unit provides each user with the proper signal levels and timing. The problem of providing timing is not as crucial in this device as in the multiplexer, since most receiving subscribers are designed to accept timing from the source or equivalently derive it from the data. In the instances when the receiving user station wishes to dictate timing, then the problem of supplying buffering or idle characters presents itself just as in the multiplexer input interface.

The output interface unit must provide for the routing of each output from the adaptive decombiner to the proper output line. This routing is dictated by the format and is controlled from the format status control.

The output interface unit must also supply the proper D–A conversion for the situation where an analog source interfaces with the terminal.

The format status control is a unit which contains the information concerning the TDM format which has been established by the format computer at the other ground station. This information is used to perform the necessary routing between decombiner outputs and tributary users and establish the necessary controls for the decombiner. The information contained in the format status control is received from the format computer whenever adapting occurs and the traffic situation is to be changed. There is also an input to the format status control from the adaptive receiver rate control 57 of FIG. 1 giving the link rate.

The format status control is basically a memory with some logic to derive control and routing information. As such it could be a part of a computer. There should be coordination between the format status control unit and users to know which lines are to be dropped from service and to alarm users when they are being dropped.

The adaptive decombining technique is the exact inverse of the combining technique. This is especially true herein since one of the primary requirements of the combining technique was that it be systematic. This requirement was imposed partially to ease the decombiner design requirements.

The objective of the bit decombiner is to demultiplex the serial bits that come from the "Error Control Decoder" subsystem and sample them according to their lines. The decombiner is very much like the combiner since the procedure for processing the bits here is reversed. Referring now to FIG. 15, a block diagram of a decombiner is shown. Like the combiner, there is a slot generator 450 running at the same rate as that of the combiner, and there is also a slot decoder 452 that decodes these slots. These slots are used to gate the data as it comes from the error control decoder 24. Note that the data leaving the error control decoder enters the decombiner at the same rate as it left the combiner.

Corresponding to the combining matrix in the combiner there is a sampling matrix 454 in the decombiner where the appropriate bits of a given line are sampled. In addition, there is also a "pattern recognizer" (not shown) to recognize bit patterns of known bit configuration. There is also a control logic that takes certain control actions upon recognition of these patterns. The adaptive receiver rate control 57 or 59 of FIG. 1 utilizes this control logic. Referring once again to FIG. 15, a patch panel 456 is shown which provides the right slots to the lines with which they are associated for correct sampling. Thus the slot/line relationship used by the combiner during a given transmission will have to be known by the decombiner so that proper demultiplexing can be performed.

The general philosophy of the demultiplexer can best be demonstrated by the example used in the combiner section. In that example the slot/line relationships for the eight lines were:

$$L8 = S_2 + S_4 + \ldots + S_{64}$$
$$L7 = S_3 + S_7 + \ldots + S_{63}$$
$$L6 = S_5 + S_{13} + \ldots + S_{61}$$
$$L5 = S_9 + S_{25} + S_{41} + S_{57}$$
$$L4 = S_{49}$$
$$L3 = S_{33}$$
$$L2 = S_{17}$$
$$L1 = S_1$$

The logical implementation of these equations appears in the wired patch panel of FIG. 15. This is the inverse of that appearing in the combiner section and the reader is referred to that section for further detail.

ADAPTIVE DECISION CONTROL SUBSYSTEM

Up to this point, we have discussed a group of subsystems which together constitute a transmitting and receiving system which can be adapted to transmit and receive digital information at different rates. These subsystems are, of course, responsive to an adaptive decision control subsystem which defines when and under what conditions adapting takes place.

The adaptive decision control subsystem that will be described herein is an on-line adapting subsystem which enables the over-all communication system to adapt without creating a gap in the transmission. This type of subsystem can be utilized when the bit duration requires adapting in a slowly degrading communications link in which transmission is established, there being no need to re-establish error control framing at the time of channel adapting.

Referring now to FIG. 1, the adaptive decision control consists of S/N monitor 28 or 52, decade monitor 30 or 54, adaptive decision control 32 or 56, adaptive transmit rate control 50 or 58, and adaptive receiver rate control 57 or 59.

The need to adapt is transmitted by the receiving end via the transmitter control input P or Q to the remote transmitter terminal. This information is transmitted to the format computer, where formatting decisions will be made to meet the user demand and current link channel capacity. Once formatting decisions have been made by the format computer the adapting process can be executed.

The transmitting terminal can execute the formatting decision provided by the format computer and report to the users the action that it has taken.

When the adapting does not require modem lock up nor reframing, the on-line coordination technique provides an efficient method of coordinating the adapting process without creating a gap in the transmission. The transmitting terminal receives the request to adapt via the receiver control input P or Q from the remote receiving terminal. On its receipt of this request, the transmitting terminal acknowledges (via the transmitter control input P or Q) that the request to adapt has been received, and that the following multiplex frame will be adapted. This enables the receiving terminal to adapt without ambiguity.

The transmitter control loops for on-line adapting are shown in FIG. 16. In order to adapt the bit duration, two changes are required: (a) number of slots within a frame, and (b) the clock. In the transmitter, the slots are generated by the line slot generator 813 of the combiner subsystem as discussed previously. One of the inputs to this generator, as mentioned previously, comes from a shift pulse decision logic 809 that determines the number of slots to be generated. This decision logic consists of a number of gates to accommodate all the transmission rates through the link channel: namely, $$2^{e}\times 75\ (1+k)$$

There will be two inputs to each gate: one specifies the number of slots to be generated; the other is an adaptive control signal that comes from the adaptive transmit rate control logic 50 or 58 and decides whether the gate should be opened to allow the generator to provide this number of slots.

The other input to the generator comes from another decision logic, the slot rate decision 807, that is also controlled by the adaptive control signals and fed by clocks of different frequencies. Here again, there are a number of AND gates, corresponding to the number of transmission rates, which are used to drive the generator. A single gate is allowed to be opened during a given transmission so that the frequency of the shift pulse that feeds the gate coincides with the transmission rate. Therefore, when adapting takes place, the adaptive control signal enables two gates at the input of the slot generator, one that generates the correct number of slots and one that provides a shift pulse of correct frequency. At the same time, the control signal inhibits the two gates which were previously enabled.

The other parts of the transmitter that are affected are the source control buffer 512 and error control encoder 14. These two subsystems also use different clocks at different transmission rates. Therefore, the adaptive control signal switches the clocks when adapting takes place.

Thus, when the input signal from the receiving terminal is decombined in the decombining matrix 801, and recognized by pattern recognizer 803, adaptive transmit rate control 50 is set. This in turn controls slots rate decision 807, shift pulse decision 809 and shift pulse decision 811. The latter circuit controls the error control encoder bit counter as discussed in the section relating to the error control encoder. The slot rate decision 807 and shift pulse decision 809 control the line slot generator 813. Both shift pulse decision units control the source control buffer.

In addition, the adaptive transmit rate control enables the approximate gate in the combiner output to allow the combined data to come out of the correct combining matrix (refer to combining matrix 360–366 of FIG. 8).

Figure 2:
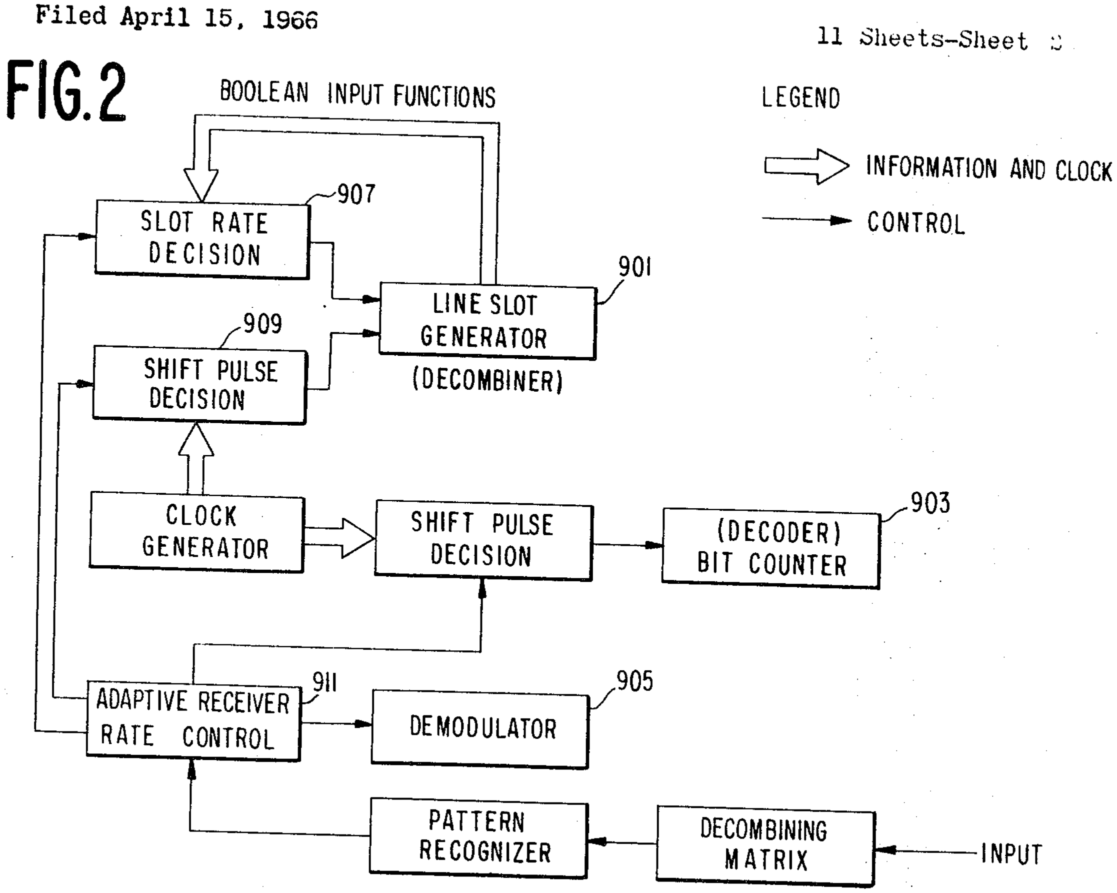
FIG. 2 is a block diagram of the receiver control loops for on-line adapting.

A block diagram of the receiver control loops for on-line adapting is shown in FIG. 2.

At the receiver, the parts that are affected by adapting are the line slot generator 901 of the decombiner; the error control decoder 903, and the modem 905.

In the input of the line slot generator, only two gates are allowed to open during a given transmission. The slot rate decision 907 controls the generation of the slots, and the shift pulse decision 909 controls the frequency of the shift pulse. The control signal that enables these gates comes from the adaptive receiver rate control logic 911. When adapting takes place, a control signal associated with the adaptive rate inhibits the present gates and at the same time enables another pair of gates.

As for the error control decoder 903, the adaptive control signals control the gates that have in their inputs all the clocks with frequencies that correspond to different transmission rates through the communication channel. Therefore, when adapting takes place only the gate that has a clock with the correct frequency in its input will be enabled by the adaptive control signal.

The demodulator 905 is the other part of the receiver that will be affected by adapting. Here, the adaptive control signal affects the modem because the change in the bit duration requires changing the frequency bandwidth; thus adapting necessitates switching the bandpass filters of the modulator as discussed previously.

The estimation of the received signal-to-noise ratio and the monitoring of the error control decoding operation at the receiving link terminal provide the basis for adapting the communication system. For signal-to-noise etsimation for a channel with fixed noise power, the amplitude samples of the received signal plus noise waveform can be statistically evaluated to estimate the received signal-to-noise ratio.

A general on-line method of estimating the received signal-to-noise ratio in a noise-power-varying channel is reported in Nahi (see below). Many other prior art techniques for making such as measurement could likewise be utilized. This system is shown generally in FIG. 1 and and consists of S/N monitors 28 or 54.

The error rate of the decoder are provides an input to the adaptive decision control 32 or 56.

While the system is adapting, the error rate is maintained below the allowable level by using error control coding techniques. Under normal channel conditions, the bit error rate after decoding is less than the required level; and as the channel degrades, the bit error rate after decoding approaches the specified bit error rate. The error control decoding operation is thus monitored as explained previously to estimate the channel state and used in conjunction with the received signal-to-noise ratio estimate in the decision to adapt the channel.

In a channel in which independent errors dominate the cyclic code (63, 56) discussed previously can be used effectively to meet the requirements specified above. The adaptive system utilizes the same cyclic code for all adapted rates however, it is recognized that the system could also adapt by changing the number of redundant bits as described in the afore-referenced application to Alexander H. Frey and by changing the bit duration.

While the invention has been particularly shown and described with respect to a preferred embodiment thereof, it will be understood by those skilled in the art that various changes in form and detail may be made therein without departing from the spirit and scope of the invention. For example, it is recognized that the transmission rate may be adapted by tripling the bit duration instead of doubling it, or the transmission rate may be adapted in accordance with any other adaptive technique wherein the bit duration is increased or decreased in accordance with environmental conditions.

Further, there are several other multiplexing techniques which can be utilized in an adaptive system to combine a plurality of inputs and provide an output which is the sum of the actual input rates and which can be readily adapted to provide a different output rate. Further, the adaptive decision control subsystem can utilize adapting techniques other than on-line adapting described herein. An example of such a technique would be one wherein transmission is halted while the system is being adapted to the new rate and restarted at the new rate. It is also recognized that a special link can be established between the stations to re-establish transmission in the case of catastrophic failures. This link would provide for re-synchronization of the main channel and for rate information exchange.

It should be noted that the description of the system utilized an example wherein the environmental noise increased thereby necessitating adapting by decreasing the transmission rate and increasing bit durations. As one skilled in the art would recognize, when the environmental conditions are such that the external noise is decreasing the system can adapt to a higher rate of transmission and shorter bit durations.

We claim:

1. A digital communications system having a transmitting station and a receiving station, and wherein a parameter of the signal transmitted from the transmitting station is adapted in accordance with an error rate of the signal received at the receiving station, said system including:

a plurality of digital inputs at said transmitting station, each of said inputs having an independent information rate which is the same as or different from the information rate of any other of said inputs, each of said inputs further being assigned a priority relative to another one of said inputs;

a multiplexer for combining each of said inputs into a time division multiplexed output signal having an information rate and bit duration determined by the number of said inputs and the information rates of each of said number of inputs;

transmitting means for transmitting said multiplexed output signal;

receiving means at the receiving station for receiving said multiplexed output signal from the transmitting station;

a demultiplexer for decombining said multiplexed output signal at the receiving station into a plurality of outputs which are identical to the inputs combined by said multiplexer;

an error detector for detecting and designating the error rate in said multiplexed output signal at the receiving station;

adaptive decision control means responsive to an error designating signal at said error detector and for supplying a signal to the transmitting station when the error rate exceeds a specified limit;

adaptive transmit rate control means located at the transmitting station responsive to the signal from said adaptive decision control means for altering the number of inputs to said multiplexer in accordance with their respective priorities.

2. The communications system set forth in claim 1 wherein the data to be transmitted is encoded with redundant bits by an error control encoding means, said system also having an error control decoder located at the receiving station to decode the redundant bits from the received multiplexed output signal, said error control encoder and error control decoder providing an additional safety margin so that information is not lost in degrading communication channel prior to adapting.

3. The communications system set forth in claim 2 wherein the error detector comprises means for measuring the signal-to-noise ratio of the received signal and means for monitoring the error rate of the error control decoder, the signal-to-noise ratio and the error rate of the decoder designating the error rate in the multiplexed output signal.

4. The communications system set forth in claim 1 wherein the multiplexer comprises means for alternating high priority inputs with low priority inputs in the multiplexed output signal; and adapting means responsive to the adaptive transmit rate control means for expanding the high priority input signals in the multiplexed output so that the high priority input signals have a longer bit duration.

5. A full duplex communications system having two stations wherein parameters of signal transmission are adapted in accordance with the error rate of the received signal, each station of said system including:

a plurality of digital inputs, each of said inputs having an independent information rate which is different or the same as the information rate of any other of said inputs, each of said inputs further being assigned a priority with respect to each other input;

a multiplexer for combining each of said inputs into a time division multiplexed output signal having an information rate and bit duration determined by the number of said inputs and the information rates of each of said inputs, said multiplexer having means for alternating high priority inputs with lower priority inputs in the multiplexed output signal, and adapting means responsive to a control signal for expanding the high priority input signals in the multiplexed output signal so that the high priority input signals have a longer bit duration;

error control encoding means for encoding redundant bits into the multiplexed output signal of the multiplexer and providing an encoded output bit stream;

a modulator responsive to the error control encoder for modulating the output bit stream of the error control encoder and providing a modulated bit stream output signal;

transmitting means for transmitting the modulated output signal of the modulator;

receiving means for receiving the transmitted modulated output signal of the other station's transmitting means;

a demodulator for demodulating the signal received by the receiving means, and for providing a demodulated signal, said demodulator being responsive to a receiver rate control signal for selecting one of a plurality of band pass filters through which the signal received by the receiving means is to be received in accordance with its information rate;

error control decoding means responsive to the demodulator for decoding the demodulated signal and for providing a decoded signal;

a demultiplexer responsive to the error control decoding means for decombining the decoded signal into a plurality of outputs which are identical to the inputs combined by the multiplexer at the transmitting station, said demultiplexer having adaptive decombining means responsive to a receiver rate control signal for decombining the decoded signal in accordance with its bit duration;

a signal noise detector for detecting the signal-to-noise ratio of the received signal;

decode monitor means responsive to the error control decoding means for monitoring the number of errors detected by said error control decoding means;

adaptive decision control means responsive to the signal noise detector and to the decode monitor means for determining whether the communications system should adapt by changing the bit durations of each pulse to be transmitted;

adaptive transmit rate control means responsive to the adaptive decision control means of the other station for providing control pulses to the adaptive digital multiplexer, said control pulses activating the adapting means of the multiplexer;

an adaptive receiver rate control means responsive to the adaptive transmit rate control means for providing a receiver rate control signal to the demodulator and demultiplexer, said receiver rate control signal activating one of said band pass filters of the demodulator in accordance with the bit duration of the transmitted signal and activating the adaptive decombining means of the demultiplexer.

6. The digital communications system set for in claim 5 wherein said adaptive transmit rate control means supplies a control-signal which is multiplexed by the multiplexer along with the digital inputs, said adaptive receiver rate control means having recognition means responsive to said control signal for activating said receiver control signal.

References Cited

UNITED STATES PATENTS 3,331,071 7/1967 Webb -------------- 325—15

RODNEY D. BENNETT, Jr., Primary Examiner

C. E. WANDS, Assistant Examiner

U.S. Cl. X.R.

179—15

UNITED STATES PATENT OFFICE
CERTIFICATE OF CORRECTION

Patent No. 3,534,264 Dated October 13, 1970

Inventor(s) Herman L. Blasbalg, Joshua Y. Hayase, Richard C. Crutchfield, Jr. and J.F. Najjar It is certified that error appears in the above-identified patent and that said Letters Patent are hereby corrected as shown below:

Column 6, line 10, "reciving" is misspelled, it should read --receiving--.

Column 8, line 52, "line 1" should read --time 1--.

Column 10, line 25, the upper limit of the first summation expression shown as "l-j" is incorrect, it should read -- -l --.

Column 10, line 62, the word --input-- should be insert after the words "between the various".

Column 11, line 59, the phrase "When the register is full of" should read --When the register is full to--.

Column 13, line 5, the equation "$j=0, 1, 2...(2^{l-1}-)$" is incorrect, it should read --$j=0, 1, 2, ..., (2^{l-2}-1)$--.

Column 16, line 10, the word --inputs--is misspelled as "imputs".

Column 17, line 34, delete "a six-bit counter 502".

Column 19, line 24, the equation "$+PN\oplus 2f_s$" is incorrectly written, it should read as -- $\pm PN\oplus 2f_s$ --.

Column 22, line 48, the word --decode-- is misspelled as "decade".

Column 24, line 8, the word --estimation-- is misspelled as "etsimation".

UNITED STATES PATENT OFFICE

CERTIFICATE OF CORRECTION

Patent No. 3,534,264 Dated October 13, 1970

Inventor(s) Herman L. Blasbalg, Joshua Y. Hayase, Richard C. Crutchfield, Jr. and J.F. Najjar

PAGE - 2

It is certified that error appears in the above-identified patent and that said Letters Patent are hereby corrected as shown below:

Column 24, line 16, the words "such as measurement" should read --such a measurement--.

Column 24, line 19, the words "are provides" should read --also provides--.

Signed and sealed this 2nd day of May 1972.

(SEAL)
Attest:

EDWARD M.FLETCHER,JR.
Attesting Officer

ROBERT GOTTSCHALK
Commissioner of Patents